(12) United States Patent
Grohs et al.

(10) Patent No.: US 11,950,546 B2
(45) Date of Patent: Apr. 9, 2024

(54) HYDROPONIC GROWER

(71) Applicant: HydroGreen, Inc., Langley (CA)

(72) Inventors: Dihl Grohs, Sioux Falls, SD (US); Ryan Joens, Lennox, SD (US); Craig Livingston, Canistota, SD (US)

(73) Assignee: HYDROGREEN, INC., Langley (CA)

( * ) Notice: Subject to any disclaimer, the term of this patent is extended or adjusted under 35 U.S.C. 154(b) by 0 days.

(21) Appl. No.: 17/892,694

(22) Filed: Aug. 22, 2022

(65) Prior Publication Data
US 2022/0408668 A1 Dec. 29, 2022

Related U.S. Application Data

(62) Division of application No. 17/431,973, filed as application No. PCT/US2020/018595 on Feb. 18, 2020, now Pat. No. 11,606,919.

(Continued)

(51) Int. Cl.
A01K 31/04 (2006.01)
A01G 31/04 (2006.01)
(Continued)

(52) U.S. Cl.
CPC ............. A01G 31/04 (2013.01); G01V 1/364 (2013.01); G01V 1/38 (2013.01);
(Continued)

(58) Field of Classification Search
CPC ...... A01K 31/04; A01K 31/042; A01K 31/02; A01K 31/06
See application file for complete search history.

(56) References Cited

U.S. PATENT DOCUMENTS 3,284,948 A * 11/1966 Kyle .................... A01G 31/042
47/65
3,425,158 A * 2/1969 Kyle .................... A01G 31/042
226/170
(Continued)

FOREIGN PATENT DOCUMENTS

AU 2012254950 A1 6/2014
CN 104202965 A 12/2014
(Continued)

OTHER PUBLICATIONS

Australia Intellectual Property, Examination Report No. 1, Application No. 2020225282, dated Aug. 23, 2021, 4 pages.
(Continued)

Primary Examiner — Kristen C Hayes
(74) Attorney, Agent, or Firm — Goodhue, Coleman & Owens, P.C.

(57) ABSTRACT

A hydroponic growing apparatus, system, and method is provided. The hydroponic grower includes one or more seed beds each having a length and a width operably supported by a framework. A seed belt is rotatable around each of the one or more seed beds between loading and offloading positions to and from a seed growing position. Seed is discharged onto the seed belt for hydroponically growing a seed atop of the one or more seed beds. Seed growth can be offloaded through the path of a stream of liquid exiting a liquid nozzle for cutting through offloaded seed growth in at least one direction.

12 Claims, 24 Drawing Sheets

Related U.S. Application Data

(60) Provisional application No. 62/807,623, filed on Feb. 19, 2019.

(51) Int. Cl.
*G01V 1/36* (2006.01)
*G01V 1/38* (2006.01)

(52) U.S. Cl.
CPC ............... *G01V 2210/1293* (2013.01); *G01V 2210/1427* (2013.01); *G01V 2210/324* (2013.01)

(56) References Cited

U.S. PATENT DOCUMENTS

| | | | |
|---|---|---|---|
| 3,664,061 A * | 5/1972 | Oepen | A01G 31/042 47/59 R |
| 5,073,401 A | 12/1991 | Mohr | |
| 8,627,598 B1 | 1/2014 | Souder et al. | |
| 11,229,170 B2 * | 1/2022 | Martin | A01G 31/06 |
| 2003/0101645 A1 | 6/2003 | Cole | |
| 2012/0297678 A1 * | 11/2012 | Luebbers | A01G 31/02 47/62 A |
| 2017/0055461 A1 | 3/2017 | Neuhoff, Jr. et al. | |
| 2018/0035624 A1 | 2/2018 | Itoh | |
| 2019/0230876 A1 * | 8/2019 | Lysaa | A01G 27/005 |
| 2022/0110276 A1 * | 4/2022 | Grohs | A01G 31/06 |

FOREIGN PATENT DOCUMENTS

| | | | | |
|---|---|---|---|---|
| CN | 105792641 A | 7/2016 | | |
| CN | 109328973 A | 2/2019 | | |
| JP | 85862848 U | 4/1983 | | |
| JP | H0847348 A | 2/1996 | | |
| JP | 2001136850 A | 5/2001 | | |
| JP | 2014060938 A | 4/2014 | | |
| JP | 2016021944 A | 2/2016 | | |
| NL | 8601352 A * | 12/1987 | ............. | A01G 1/042 |
| WO | 2017030524 A1 | 2/2017 | | |
| WO | WO-2017030524 A1 * | 2/2017 | | |

OTHER PUBLICATIONS

China National Intellectual Property Administration (CNIPA), first office action dated Dec. 15, 2021, 2 pages.
First Examination Report, Canadian Application No. 3,130,769, dated Oct. 8, 2021, 4 pages.
Intellectual Property India, First Examination Report, Application No. 202127034737, dated Mar. 2, 2022, 6 Pages.
International Preliminary Report On Patentability, PCT/US2020/018595, dated Sep. 2, 2021, 7 Pages.
International Search Report & Written Opinion, PCT/US2020/018595, dated Apr. 24, 2020, 11 Pages.
Japan Patent Office, First Office Action, Japanese application No. 2021-548223, dated Jan. 11, 2022, 4 pages.
European Patent Office, EPO Invitation, European Application No. 20 759 631.3, HydroGreen, Inc., dated Sep. 7, 2022, 6 pages.
Intellectual Property India, First Examination Report, Application No. 202228047095, dated Jan. 5, 2023, 6 Pages.
Japan Patent Office, Second Office Action, Japanese application No. 2021-548223, dated Apr. 20, 2022, 3 pages.

* cited by examiner

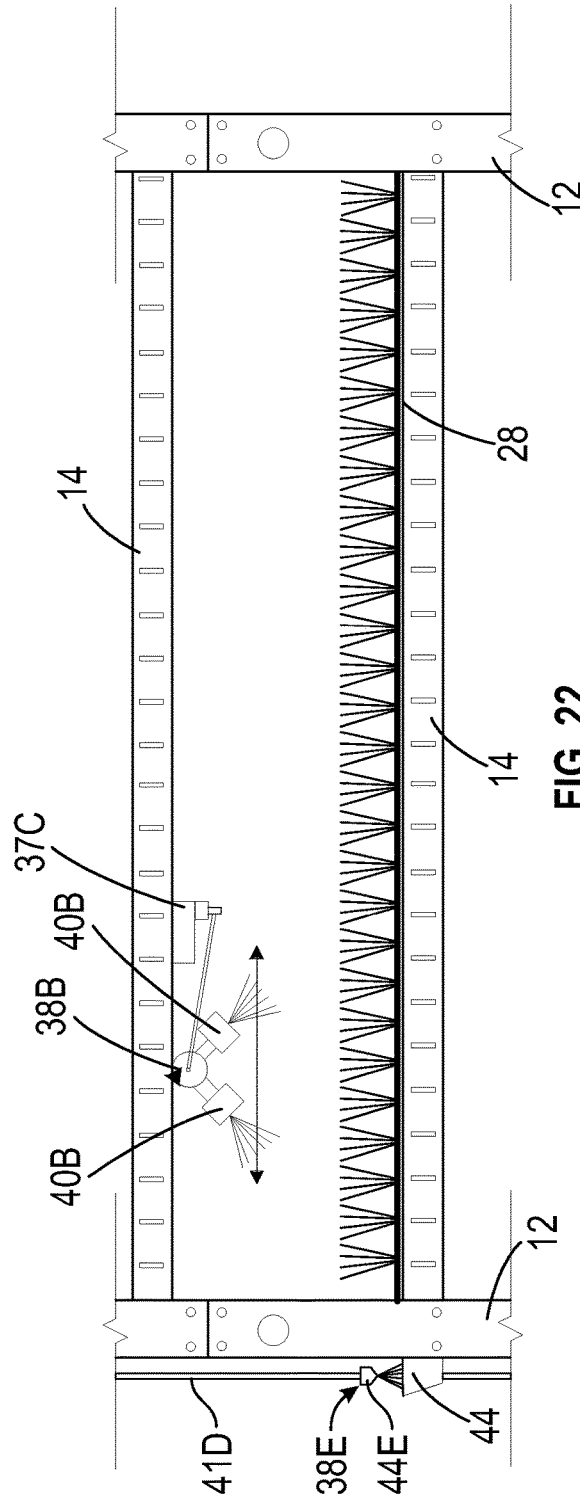
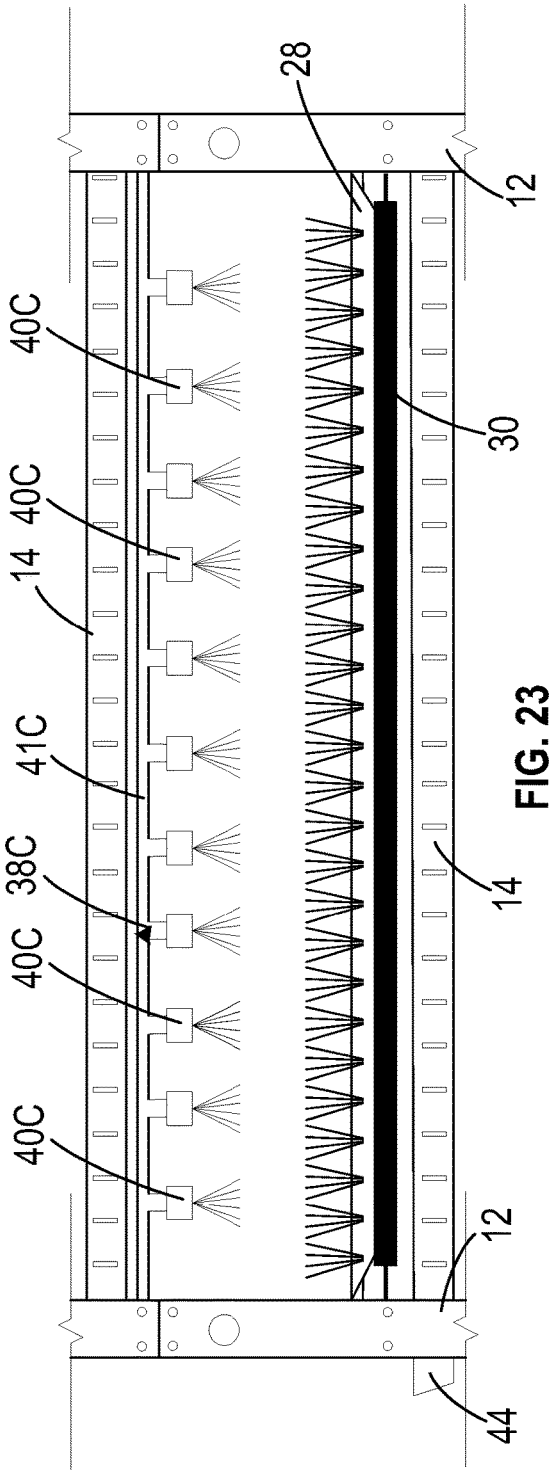
FIG. 22
FIG. 23

HYDROPONIC GROWER

PRIORITY STATEMENT

This application is a divisional of U.S. Non-provisional application Ser. No. 17/431,973, filed on Aug. 18, 2021, which is a 371 application of and claims priority to Patent Cooperation Treaty Application No. PCT/US20/18595, filed on Feb. 18, 2020, which claims priority to U.S. Provisional Patent Application No. 62/807,623, filed on Feb. 19, 2019, all titled HYDROPONIC GROWER all of which are hereby incorporated by reference in their entireties.

BACKGROUND

I. Field of the Disclosure

The present disclosure relates to a hydroponic grower. More specifically, but not exclusively, the present disclosure relates to a hydroponic growing apparatus, system, and method.

II. Description of the Art

Hydroponic seed growing is of increasing interest for many reasons. The increasing cost for raising seed have become, in some instances, cost prohibitive. Alternative measures for raising seed are quickly becoming of paramount concern. Scarcity of the inputs and costs of those and other inputs for growing seed also contribute to the increase in interest in hydroponically growing seed. Other concerns include labor costs, availability of laborers, consistency of grown product, shrinking availability of and increases in cost of farmland, reduction to carbon footprint, availability of food in highly populated areas, and public interest in whole-sourced foods. Still, existing hydroponic systems do not solve the present concerns and the need for a cost-effective solution for growing seed hydroponically.

SUMMARY OF THE DISCLOSURE

Therefore, it is an object, feature, or advantage of the present disclosure to provide a hydroponic growing apparatus, system, and method that addresses the deficiencies in existing hydroponic and non-hydroponic processes for growing seed.

Often, hydroponic systems are developed and sold without the volume of seed production and return on investment being an integral factor. In other words, existing systems are not easily tailorable to fit the size of a herd.

Therefore, another object, feature, or advantage of the present disclosure is to provide a hydroponic growing apparatus, system, and method that is completely tailorable to fit the specific volume of seed production desired and meets the return on investment criteria considered when weighing other hydroponic and non-hydroponic seed growing options.

A significant factor in growing seed are the cost of the inputs. Water availability and cost is of increasing significance. Water and/or liquid conservation for both hydroponic and non-hydroponic seed growth is of paramount concern. Other inputs of significant, and certainly relevant consideration include the cost of seed and preservation of seed in the process of hydroponically growing seed. Still other inputs or concerns include the operational footprint or floor space needed, the electricity required, and the ability to tailor the input and output according to need and the costs, abundance/non-abundance of the relevant inputs into the process for growing seed hydroponically at comparatively low operating costs providing healthy seed growth or live green feed 365 days of the year.

Therefore, another object, feature, or advantage of the present disclosure is to provide a hydroponic growing apparatus, system, and method that maximizes the return on investment for the inputs needed for hydroponically growing seed by providing a solution that addresses each concern and other factors or concerns relevant to the process of growing seed hydroponically.

A still further object, feature, or advantage of the present disclosure is to provide a hydroponic growing apparatus, system, and method designed as modulated systems for meeting the variation in the needs of hydroponic seed growers while providing cost effective solutions for pre and post-handling seed, growing seed and managing other inputs used in the process.

Yet another object, feature, or advantage of the present disclosure is to provide a hydroponic grower for small grains or seeds such as barley and wheat that can be harvested in 3-7 days, or shorter or longer depending on the type of grain or seed being sprouted or use of the finished product.

Still another object, feature, or advantage of the present disclosure is to provide a fully automated system that with the push of a harvest button the system harvests, cleans, seeds, and re-grows seed again.

One or more of these and/or other objects, features or advantages of the present disclosure will become apparent from the specification and claims that follow.

SUMMARY OF THE DISCLOSURE

The present disclosure provides a hydroponic grower. The hydroponic grower is a seed growing system, apparatus, and method.

The hydroponic system can be a seed growing system that includes, for example, a framework configurable with one or more levels having a length and a width for providing one or more seed beds. A seed belt can be rotatably supported around each seed bed by at least one roller. The seed belt is configured for hydroponically growing a seed atop of the one or more seed beds. A seed belt motor and drive mechanism can be configured to be operable by the seed belt motor. The drive mechanism is operably attached for rotating the seed belt. A seeder is rotatably attached atop the seed bed and the seeder can be configured with an intake connected to a seed source 66, such as a seed hopper, and a discharge end for dispensing seed onto the seed belt. The seed growing system includes one or more first cutters each having a liquid nozzle for discharging a liquid for transversely cutting through offloaded seed growth. The one or more first cutters can be operably mounted to a carriage configured for transverse movement at least partially across the width of the framework. The seed growing system can also be configured with one or more second cutters each having a liquid nozzle for discharging a liquid for cutting laterally through offloaded seed growth. The one or more second cutters can be spaced across the width of the framework.

The hydroponic system can be a seed growing apparatus that includes, for example, a hydroponic seed grower for hydroponically growing a variety of seed. The hydroponic seed grower can include a plurality of seed beds operably supported by a framework, where each seed bed disposed across a length and a width of the framework. A seed belt is operable on each of the plurality of seed beds between loading and offloading positions to and from a seed growing position. A seed belt motor can be operably attached to the seed belt for rotating the seed belt between loading and offloading positions to and from the seed growing position. A liquid nozzle can be operably attached adjacent the seed belt for cutting offloaded seed growth along a first direction. The liquid nozzle can be configured having a discharge for discharging a liquid for cutting through offloaded seed growth and an inlet operably connected to a pressurized liquid source.

The hydroponic system can be a method for hydroponically growing seed, such as for example, a method for hydroponically growing a variety of seed. The method can include providing one or more seed beds each having a length and a width operably supported by a framework. Steps can include, for example, rotating a seed belt around each of the one or more seed beds between loading and offloading positions to and from a seed growing position, discharging a seed onto the seed belt for hydroponically growing a seed atop of the one or more seed beds, and offloading seed growth through the path of a stream of liquid exiting a liquid nozzle for cutting through offloaded seed growth in a first direction.

BRIEF DESCRIPTION OF THE DRAWINGS

Illustrated aspects of the present disclosure are described in detail below with reference to the attached drawing figures, which are incorporated by reference herein, and where:

FIG. 22 is an end perspective view of a portion of the hydroponic grower further illustrating the irrigation system shown in FIG. 21;

FIG. 23 is a side perspective view of a portion of the hydroponic grower illustrating another irrigation system thereof;

DETAILED DESCRIPTION OF THE DISCLOSURE

Figure 1:
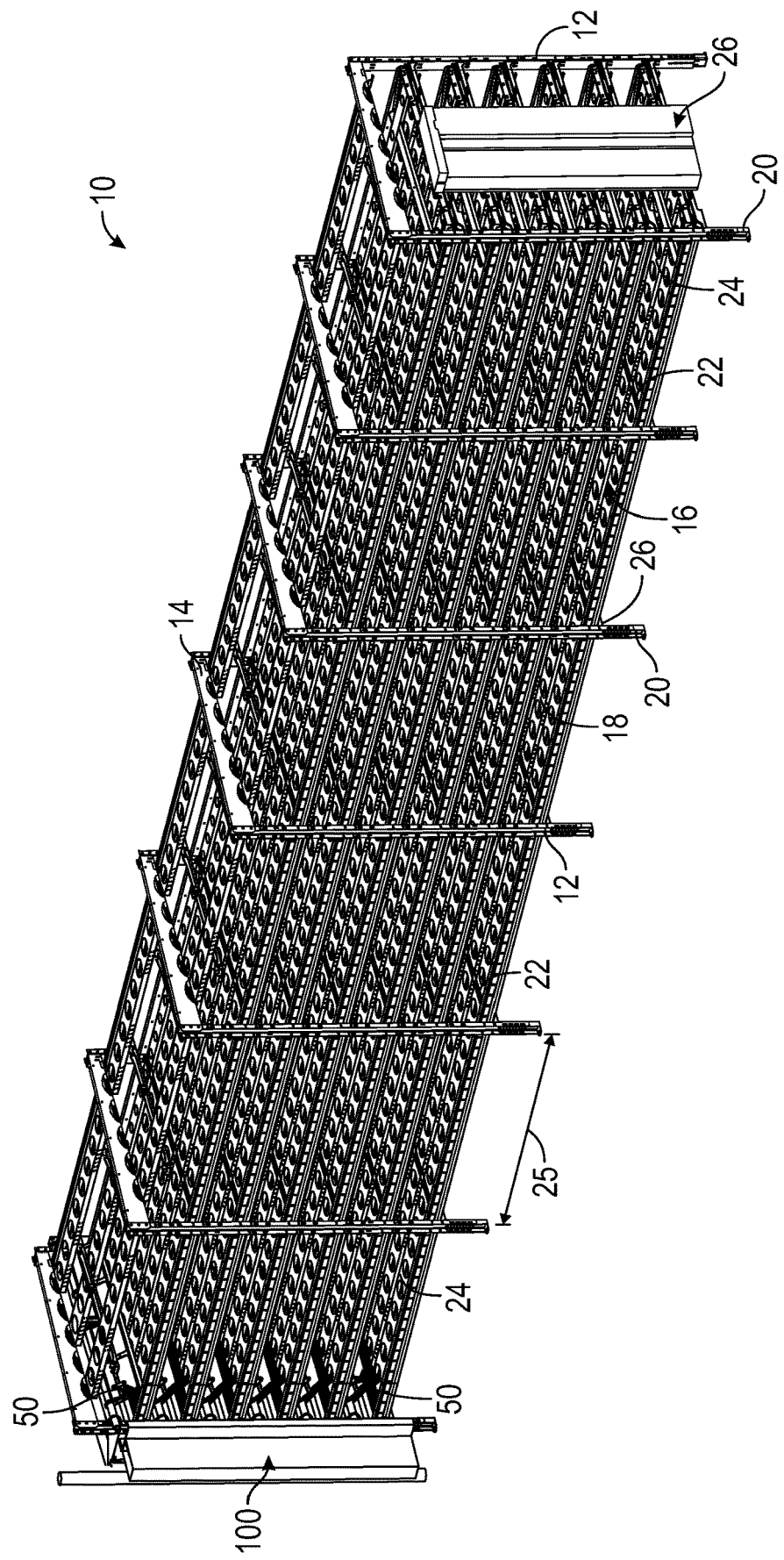
FIG. 1 is a side perspective view of a hydroponic grower in accordance with an illustrative aspect of the disclosure.
Figure 2:
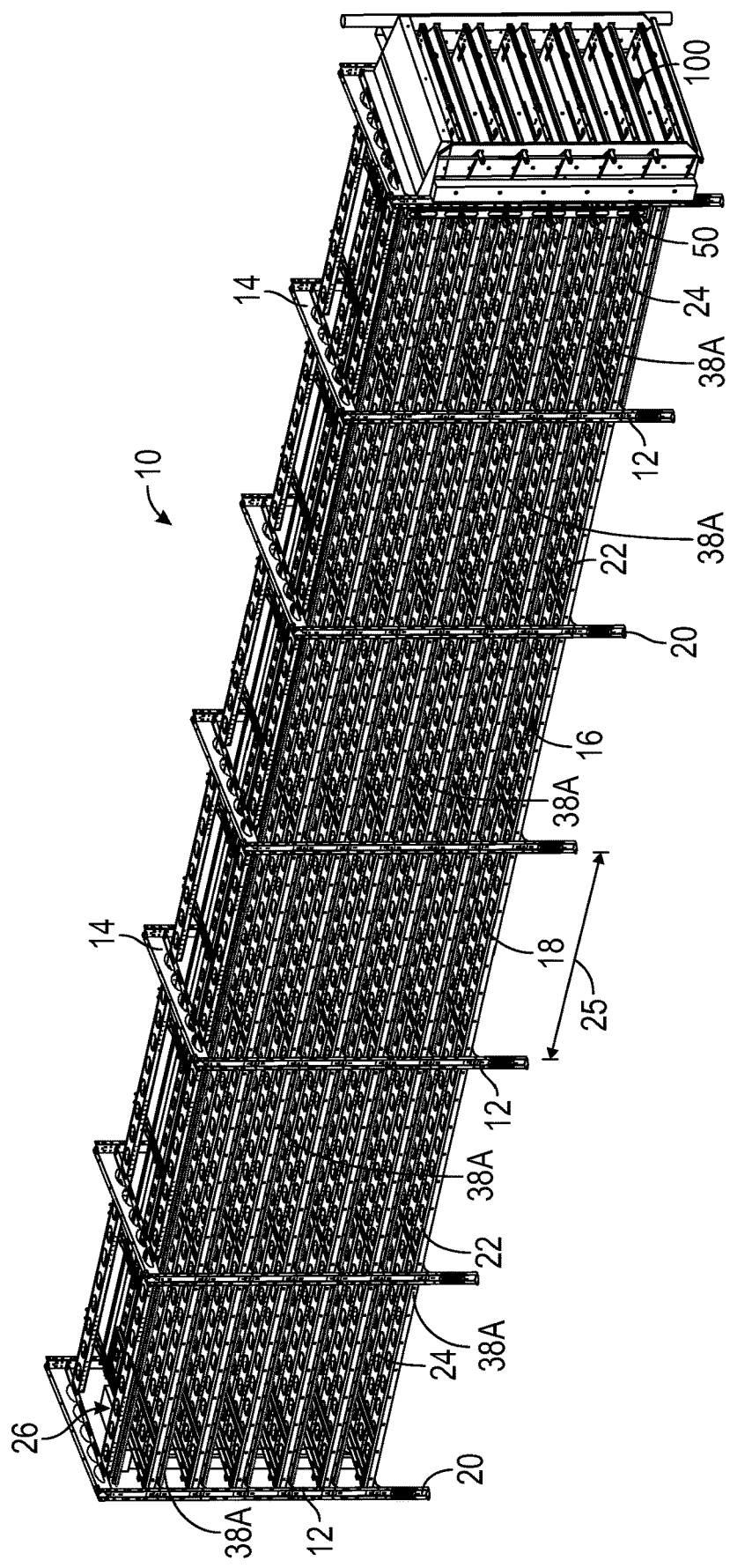
FIG. 2 is an opposite side perspective view of the hydroponic grower.
Figure 3:
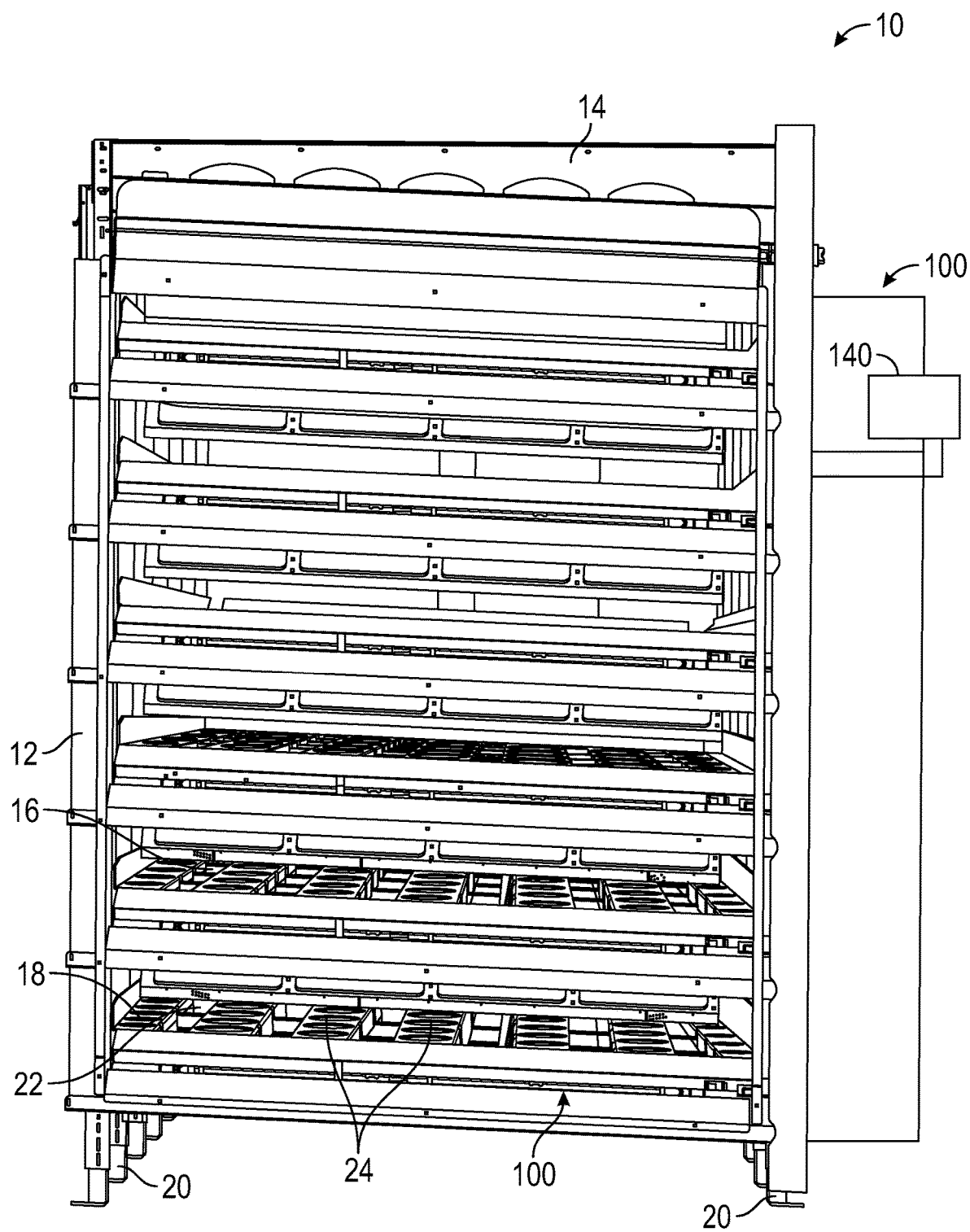
FIG. 3 is an end view of the hydroponic grower.
Figure 4:
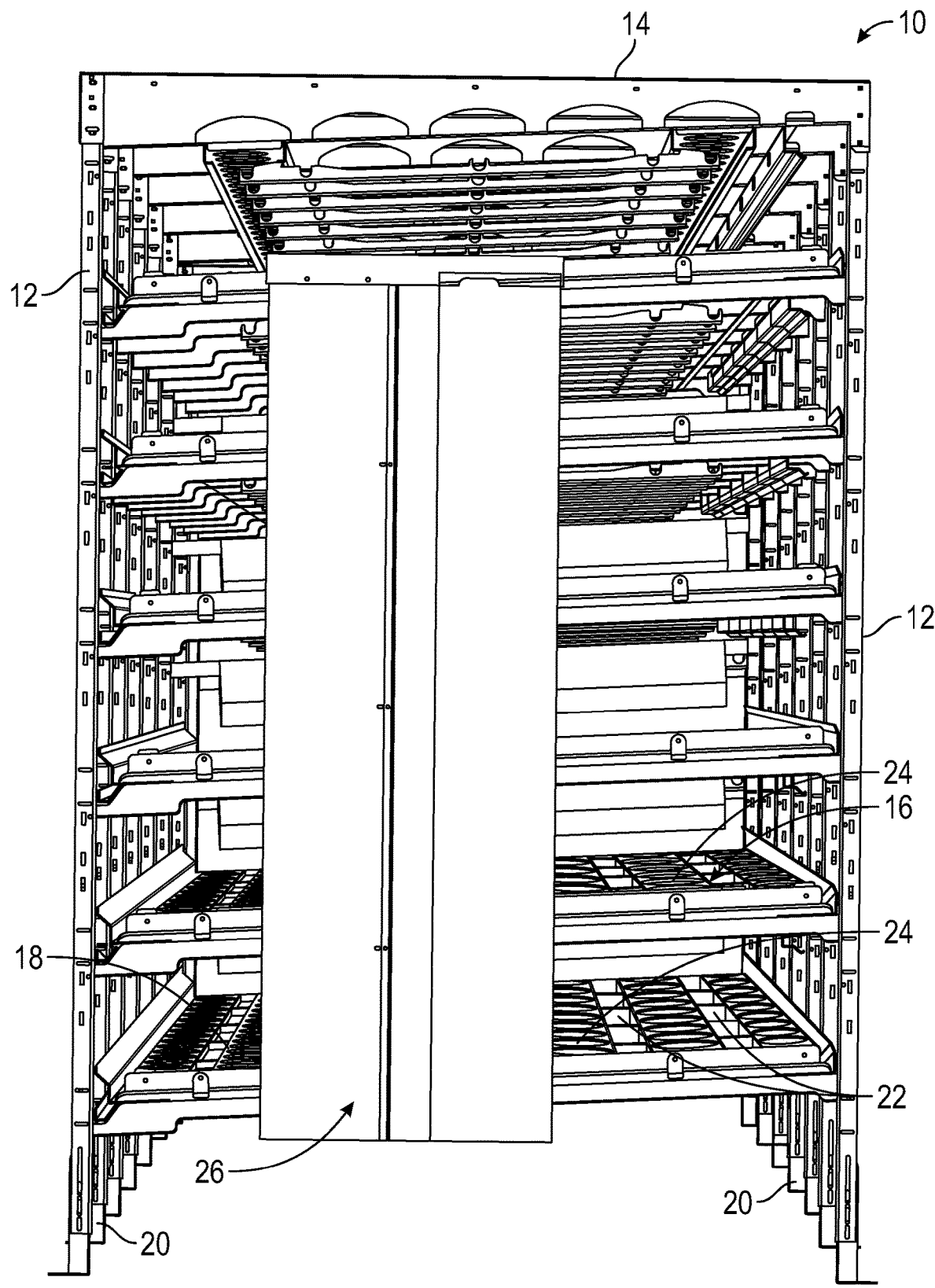
FIG. 4 is an opposite end view of the hydroponic grower.
Figure 5:
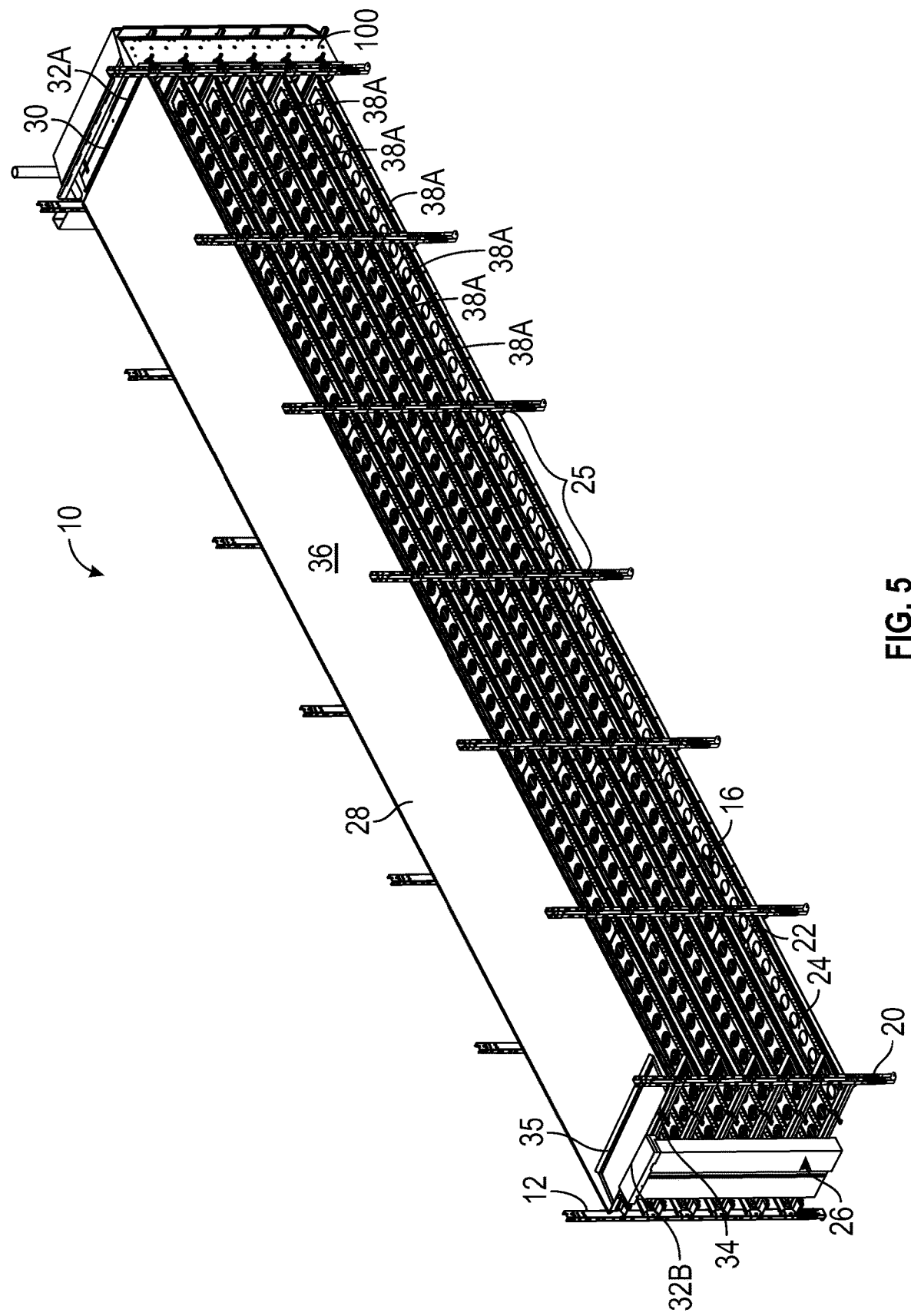
FIG. 5 is a top perspective view of the seed belt in an onloaded position in accordance with an illustrative aspect of the disclosure.
Figure 6:
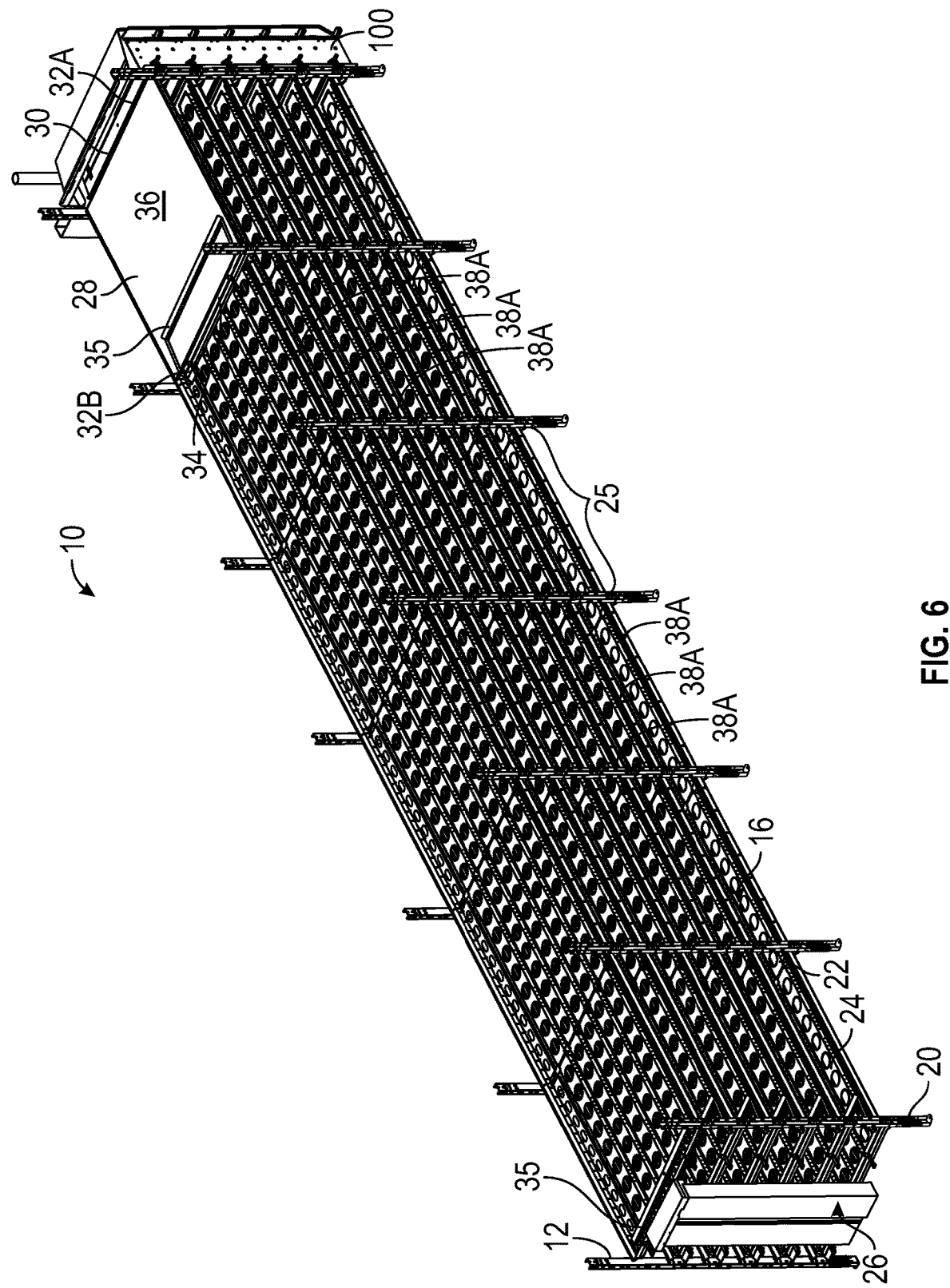
FIG. 6 is a top perspective view of the seed belt in an offloaded position in accordance with an illustrative aspect of the disclosure.
Figure 7:
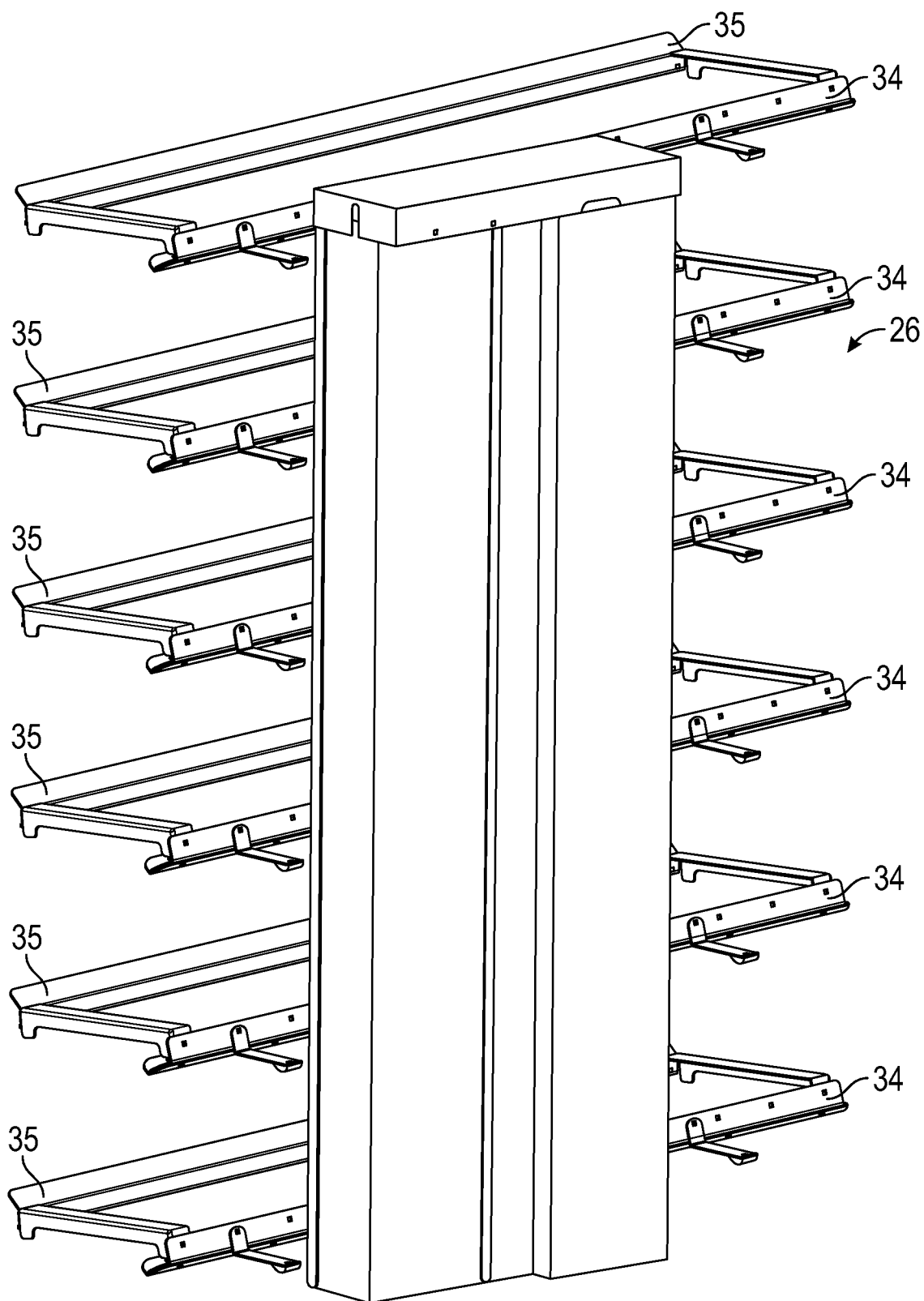
FIG. 7 is a perspective view of a seed belt return system of the hydroponic grower in accordance with an illustrative aspect of the disclosure.

The present disclosure, for example, provides a hydroponic growing apparatus, system, and method. In general, a hydroponic growing apparatus, system, and method can be operated, configured and scaled according to need and/or change in need, according to the type and/or cost of the inputs and/or change in the type and/or cost of the inputs, according to the available footprint and/or change in the available footprint for housing a hydroponic grower, according to the size and/or changes in size of a herd, according to the number of available laborers and/or change in number of available laborers, according to the climate and/or change in the climate, according to the grower's allocatable resources and/or change in the grower's allocatable resources. What follows are exemplary aspects and descriptions for one or more of a hydroponic growing apparatus, system, and method of the present disclosure.

I. Hydroponic Grower

FIGS. 1-26 are pictorial representations of a hydroponic grower 10 in accordance with an illustrative aspect. The grower 10 shown in the various views includes a plurality of vertical members 12 and a plurality of horizontal members 14 removably interconnected to form an upstanding seed growing table 16 with one or more seed beds 18. Each vertical member 12 can be configured to terminate at the bottom in an adjustable height foot 20. Each foot 20 can be adjusted to change the relative vertical position or height of one vertical member 12 relative to another vertical number 12 of the seed growing table 16. The horizontal member 14 can be configured to include one or more lateral members removably interconnected with one or more longitudinal members 24. A pair of vertical members 12 are separated laterally by a lateral member 22 thereby defining the width or depth of the seed growing table 16. In at least one aspect of the grower 10, the lateral member 22 can be configured so that the width/depth of the seed growing table 16 can range from two feet up to eight feet, and wider for specific applications. In one aspect, the growing table 16 is six feet wide. Other configurations of the grower 10 contemplate widths/depths in excess of 6-8 feet, based, for example, on the desired seed growth output and footprint for a structure housing the grower 10. In the case where narrower widths/depths are needed, the lateral member 22 can be configured so that the width/depth of the seed growing table 16 is less than six feet, and even less than two feet for specific applications. Members 12, 14, 22 and 24, including other members forming grower 10 can be comprised of stainless steel, mild steel (powder coated), mild steel (galvanized), galvanized steel, galvannealed steel and like metal/metal-alloy compositions, but are not limited to those expressly provided herein. Members of grower 10 can comprise a baked-on powder coat paint, liquid-coated painting, hot galvanized finish and/or stainless-steel finish. All contemplated parts can be laser cut to exact CAD drawing specifications, bent to appropriate shape, and in the case of the mild steel, for example, can be either powder coated or galvanized or painted. Thus, grower 10 is low maintenance and capable of long term use within a variety of environments, including corrosive ones. Also, and ideally, each lateral member 22 is removably interconnected to vertical members 12 by connector 26, such as a tongue and groove connection, to allow for quick assembly, disassembly, and reassembly of the grower 10. Although a tongue and groove connection is specified, the present disclosure contemplates other connectors, fittings, and attachment means for interconnecting components, subcomponents and assemblies of the present disclosure. For example, a slot and/or bolt configuration can be used to removably secure components of grower 10 together. Horizontal members 14 can include lateral members 22 and longitudinal members 24. As set forth herein, lateral members 22 are also described as transverse members. Longitudinal members 24 are removably interconnected with lateral members 22 by one or more connectors 26. Ideally, lateral members 22 are removably interconnected to longitudinal members 24 by a tongue and groove connection to allow for quick assembly, disassembly, and reassembly of the grower 10. Although a tongue and groove connection 26 is specified, the present disclosure contemplates other connectors, fittings, and securement means for interconnecting components, subcomponents and assemblies of the present disclosure. Longitudinal members 24 are spaced, generally equally, laterally across the depth/width of the seed growing table 16. In accordance with at least one aspect, longitudinal members 24 are spaced up to six inches apart or less to best carry the weight of each seed bed 18. Other spacing distances for longitudinal members 24 are contemplated. For example, longitudinal members 24 can be spaced closer together such as three inches apart or farther apart such as eight inches apart or greater. The spacing of longitudinal members 24 provides a subfloor for supporting seed bed 18.

The length of vertical member 12 generally determines the height of the seed growing table 16. By adjusting the height of vertical member 12 can adjust a height of seed growing table 16. The height of the seed growing table 16 can be configured, for example, according to the desired seed growth output and available footprint of the structure for housing the grower 10. The seed growing table 16, constructed vertically, can be configured with one or more seed beds 18. In at least one configuration, seed growing table 16 can be configured with 1-6 seed beds 18. In another configuration, seed growing table 16 can be configured with 1-7 seed beds 18. In another configuration, seed growing table 16 can be configured with more than 6 seed beds 18. The number of seed beds 18 can be increased or decreased according to need and available footprint of the structure for housing the grower 10. In some instances, seed growing table 16 can be configured with more than seven, more than eight, or even more than nine seed beds 18, or even more than twelve seed beds 18. Seed can be grown hydroponically to full growth in roughly 5-7 days depending upon elevation, added nutrients, irrigation, lighting, etc. The number of seed beds 18 can be configured based on the time seed needs to grow a plant to maturity. For example, a grower 10 can be configured with 6 seed beds 18 if seed growth occurs over a 6-day period, so that grown plants can be harvested from one seed bed 18 for each day of 6-day feeding cycle. Grower 10 can be configured with 7 seed beds 18 for a 7-day feeding cycle, by harvesting one bed 18 each day. If more mature plants are needed, an operator can increase the growing time of each bed 18. For example, a 6-day growing period for each seed bed 18 produces grown plants suitable for feeding all types of midsize to large animals, such as cows, horses, large swine, sheep, goat, etc. Similarly, a 3-day growing period for each seed bed 18 produces grown plants suitable for feeding small to midsize animals, such as poultry and swine. The spacing between seed beds 18 can also determine the number of seed beds 18 of seed growing table 16, in the case where vertical space is limited. For example, increasing the spacing between seed beds 18 can decrease the number of seed beds 18 of seed growing table 16, when vertical spacing is limited. Alternatively, decreasing the spacing between seed beds 18 can increase the number of seed beds 18 of seed growing table 16, when vertical spacing is limited.

The length of seed growing table 16 is determined generally by the length of horizontal member 14. A pair of vertical members 12 our removably interconnected by one or more horizontal members 14 to form a span of seed growing table 16. Like planks, horizontal members 14 are configured generally to form a subfloor for seed bed 18. The length of seed bed 18 is determined generally by the length of horizontal members 14. In at least one configuration, horizontal members 14 are eight feet in length. The growing table 16 can be configured from one or more 8-foot sections 25. The sections 25 can vary in length from eight or more feet in length or eight or less feet in length. In one aspect, each section is eight feet in length. For example, the growing table 16 can be configured from one 8-foot section, two 8-foot sections, three 8-foot sections, four 8-foot sections, five 8-foot sections, six 8-foot sections, or more. This means, seed grow table 16 can be configured to have an 8-foot, 16-foot, 24-foot, 32-foot, 40-foot, 48-foot, or more overall length. Other lengths, of course, are contemplated according to the desired grown seed output and available footprint of the structure housing grower 10.

The dimensions of seed growing table 16 are configurable according to need, desired grown plant output, available footprint of the structure housing grower 10, etc. Each of the components of seed growing table 16 are configured so that the seed growing table 16 can be modulated and thereby provide a scalable grower 10. For example, length of seed bed 18 can be configurable according to need, desired grown plant output, available footprint of the structure housing grower 10, etc. In at least one configuration, length of each section 25 of the seed bed 18 can be scalable in length from 8-foot to 16-foot, 16-foot to 24-foot, 24-foot to 32-foot, 32-foot to 40-foot, 40-foot to 48-foot, and so forth, by increasing the number of 8-foot sections 25. Alternatively, length of seed bed 18 can be configurable according to need, desired grown plant output, available footprint of the structure housing grower 10, by altering length of seed bed 18 which can be scalable in length from 48-foot to 40-foot, 40-foot to 32-foot, 32-foot to 24-foot, 24-foot to 16-foot, 16-foot to 8-foot, and so forth, by decreasing the number of 8-foot sections 25. Although dimensions are provided here, the present disclosure contemplates other increments in scalability of grower 10. The type of connectors 26 allow quick assembly, disassembly, and reassembly of grower 10. Moreover, connectors 26 and the overall design of grower 10 allow quick expansion or reduction of the size/scale of grower 10 to fit need, desired grown plant output, available footprint of the structure housing grower 10, and other consideration criteria set forth herein. By way of example, grower 10 can be configured as an 8-foot seed growing table 16 and because the design is highly scalable can be quickly converted into a larger seed growing table 16, such as a sixteen, twenty-four, thirty-two, forty-eight foot, or larger seed growing table 16. Similarly, a larger seed growing table 16 can be quickly reconfigured as a smaller seed growing table 16 to accommodate the decrease in need, desired grown plant output, or change in available footprint of the structure housing grower 10 or change in other consideration criteria set forth herein. When assembled, a need can arise to change or level seed growing table 16. Feet 20 are adjustable to adjust the level of each seed growing table 16.

II. Seed Bed, Seed Belt & Drive Mechanism

Each seed bed 18 includes a seed belt 28, such as a seed film, operably supported by seed growing table 16. Seed belt 28 can be configured according to the width/depth of seed growing table 16. By way of example, the width/depth of seed belt 28 can be altered according to changes in the width/depth of seed growing table 16. The seed belt 28, such as a seed film, can be configured of vinyl, polycarbonate, rubber, nitrile rubber, polyvinyl chloride, or other like materials. The seed belt 28 material can be a film material constructed of a polycarbonate or polypropylene material, such as the material used for a poultry manure belt. The seed belt 28 material can be hydrophobic, semi-hydrophobic or permeable to liquid. In at least one aspect, a hydrophobic material they be employed to keep liquid atop the seed belt 28. In another aspect, a permeable or semi-permeable material can be employed to allow liquid to pass through the seed belt 28. Advantages and disadvantages of both are discussed herein. In one aspect, seed belt 28 is discontinuous and has separate or separated terminal ends 32A and 32B. The seed belt 28 has a length of at least the length of the seed bed 18 and generally a width of the seed bed 18 and is configured to provide a seed bed for carrying seed. The seed belt 28 is configured to move across the seed bed 18. Seed belt 28 rests upon and slides on top of horizontal members 14. One or more skids or skid plates (not shown) may be disposed between seed belt 28 and horizontal members 14 to allow seed belt 28 to slide atop horizontal members 14 without binding up or getting stuck. Additionally, one or more lubricants can be applied to horizontal members 14 before installation of seed belt 28 or when seed belt 28 is wound upon roller 30.

To provide movement of the seed belt 28, terminal end 32A of seed belt 28 is operably attached to a roller 30. The roller 30 is configured at the end of the seed bed 18 across the width between a pair of vertical members 12. The seed belt 28 is wound onto roller 30 during movement of the seed belt 28 in a first direction. Terminal end 32B of the seed belt 28 is configured with a linkage 34. The linkage 34 is preferably secured across the width of terminal end 32B of the seed belt. The seed belt 28 is unwound off roller 30 by drawing terminal end 32B of seed belt 28 in a second direction opposite the first direction. In this manner, terminal end 32B moves across the length of seed bed 18 in first and second opposite directions for purposes discussed herein. Although the present disclosure contemplates a seed belt 28 configured as a noncontinuous belt with separate distinct (e.g., terminal) ends, in at least aspect of the disclosure seed belt 28 can be configured as a discontinuous belt with terminal ends 32A and 32B separated from each other and interconnected by linkage 34. Linkage 34 can be a cable, wire, rope, bracket or other like linkage member. One or more linkages 34 can be interconnected between terminal ends 32 of seed belt 28. Together, seed belt 28 and linkage(s) 34 can comprise a continuous belt. Thus, seed belt 28 includes a mat portion 36 and a linkage portion 34. Seed belt 28 is supported by seed bed 18. The mat portion 36 of seed belt 28 and one or more linkages 34 can be operably supported by seed bed 18. Mat portion 36 of seed belt 28 is wound upon roller. In one aspect, roller 30 can be configured as a belt roller. In one aspect, roller 30 is adjustable in position along the end of the seed bed 18 to provide better tracking of the belt 28 when winding upon and unwinding from roller 30. Although the disclosure describes a belt roller, other roller types configured to support rotation, alignment and tracking of seed belt 28 when moving are contemplated. Terminal end 32B of seed belt 28 can be configured with a push bar 35 operably attached to move with terminal end 32B when seed belt is wound upon roller 30. Push bar 35 is disposed across the width of the seed belt 28 and assists in supporting movement of seed growth toward roller 30 and stabilizing terminal end 32B of seed belt 28 during movement in the first and second direction.

Rotation of the roller 30 and movement of the seed belt in the first direction can be achieved using a drive mechanism 37A operably connected or configured to rotate the roller 30. Movement of both linkage 34 and push bar 35 attached to terminal end 32B of seed belt 28 along with terminal end 32B of seed belt 28 in the second direction can be achieved using a drive mechanism 37B operably connected or configured to rotate a reel 31. A cable 33 of belt return 26 is wound on reel 31 for moving the seed belt 28 in the second direction. Cable 33 is operably attached to linkage 34 and reel 31 for moving seed belt 28 in the second direction under operation of drive mechanism 37B. The drive mechanisms 37A and 37B can be a motor, powered electrically, pneumatically, hydraulically, or even manually. In one aspect, the drive mechanism 37A and 37B is an electrical motor powered by an electrical source remote from or associated with the seed growing table 16. The electrical motor can be a high torque motor, such as an intermittent duty 12 VDC, 10+ amp motor. For example, drive mechanism 37A can be electrically connected to an independent power source and a 16V motor used instead of a 12V motor for moving the heavier load on the seed belt 28 during harvesting. The electrical motor can be controlled by an automated or manual controller 140. A clutch 29A can be configured between the drive mechanism 37A and roller 30 for managing torque at roller 30. A clutch 29B can also be configured between drive mechanism 37B and reel 31 for managing torque at reel 31. Clutches 29A and 29B can be powered electrically, pneumatically, hydraulically, or even manually. In one aspect, clutches 29A and 29B are pneumatically driven by pneumatic sources 74A and 74B for engaging and disengaging opposing clutch plates 27A and 27AA as well as clutch plates 27B and 27BB. The clutch plates of each clutch can have planar, undulated or cogged surface profiles. Power for operating the drive mechanism 37A, drive mechanism 37B and clutches 29A and 29B (e.g., pneumatic sources 74A and 74B) can be from any number of power sources. For example, seed growing table 16 can be operably configured with a power source that is an alternating current (AC) current source or a direct current (DC) source, such as an electrochemical source or power storage device 138. Other power sources are contemplated, including but not limited to, solar power, grid power, self-generated power or manual operation. In one aspect, alternating current is converted to direct current power using a power converter 136. Direct power from power converter 136 is used to power the grower and the electrical systems operating the grower. Using direct power to run grower 10 has several benefits that include, for example, minimizing/eliminating the chance for fatal electrical shock to an operator or maintenance personal. Additionally, one or more electrochemical cells or power storage devices 138, such as batteries, can be charged with alternating current power and discharged to provide power to grower 10 during a power outage. In one aspect, grower 10 can operate for 12 to 16 hours, or more without power or during a power outage.

Figure 8:
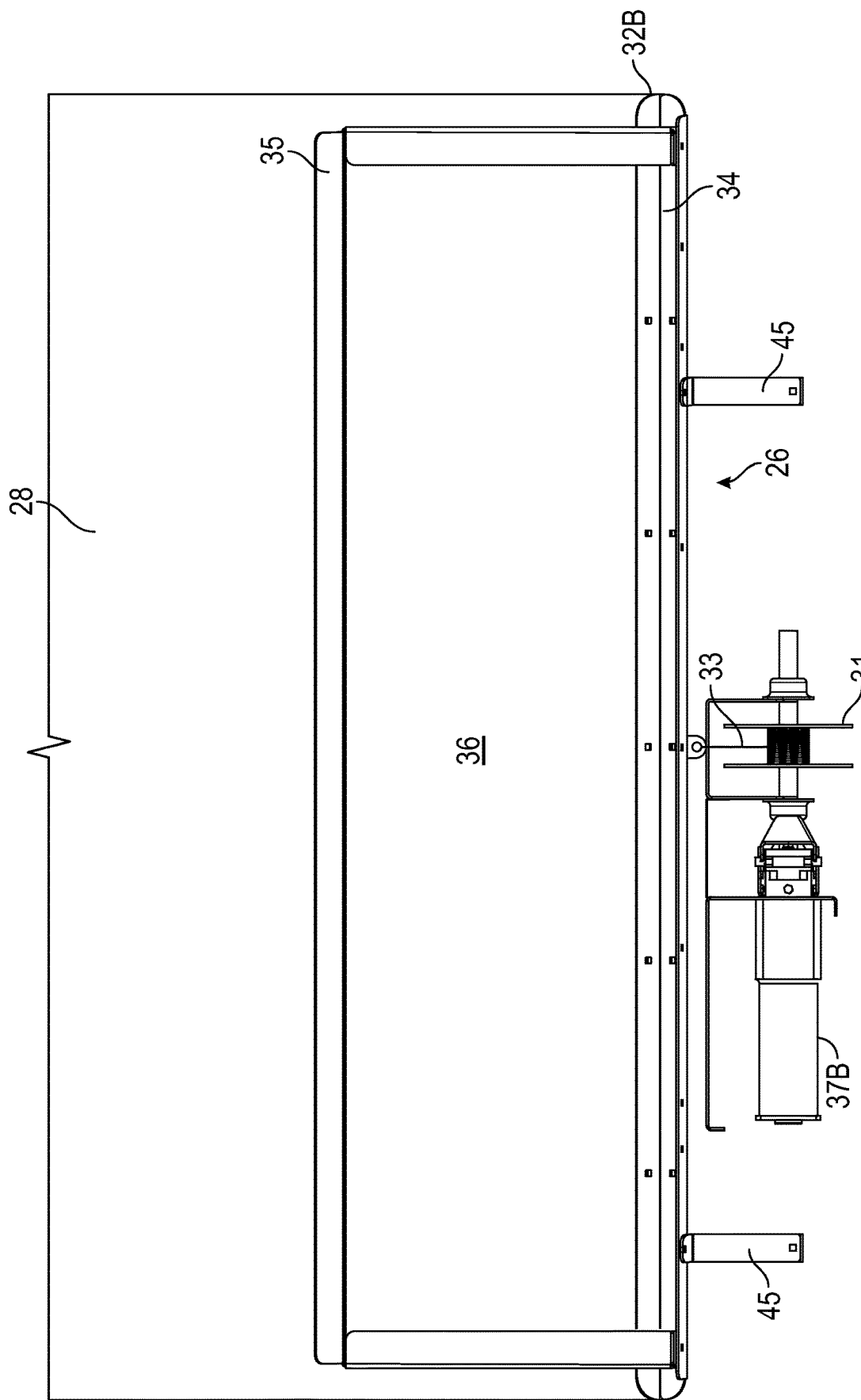
FIG. 8 is a top view of the seed belt return system.
Figure 9:
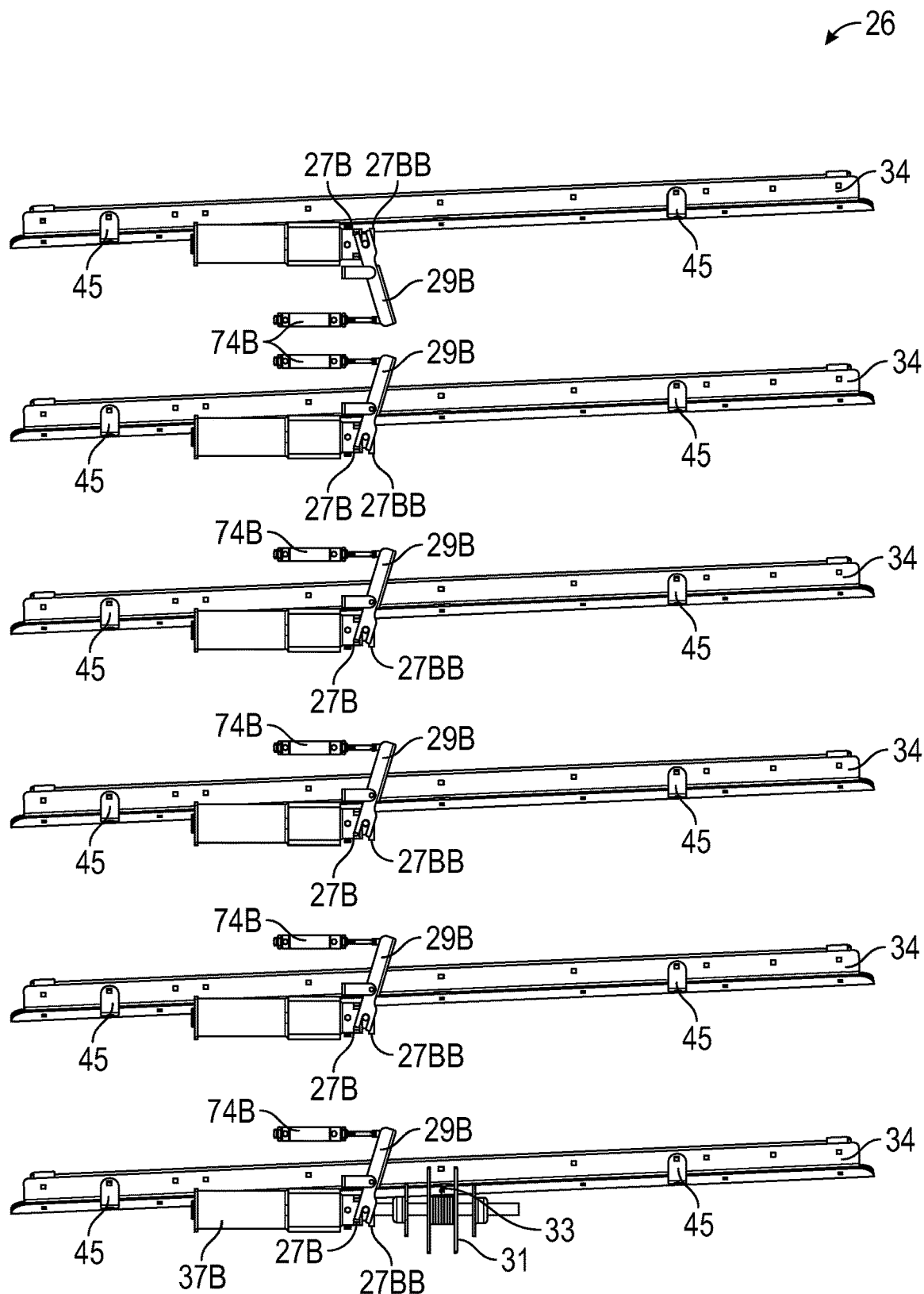
FIG. 9 is an end view of the seed belt return system.
Figure 10:
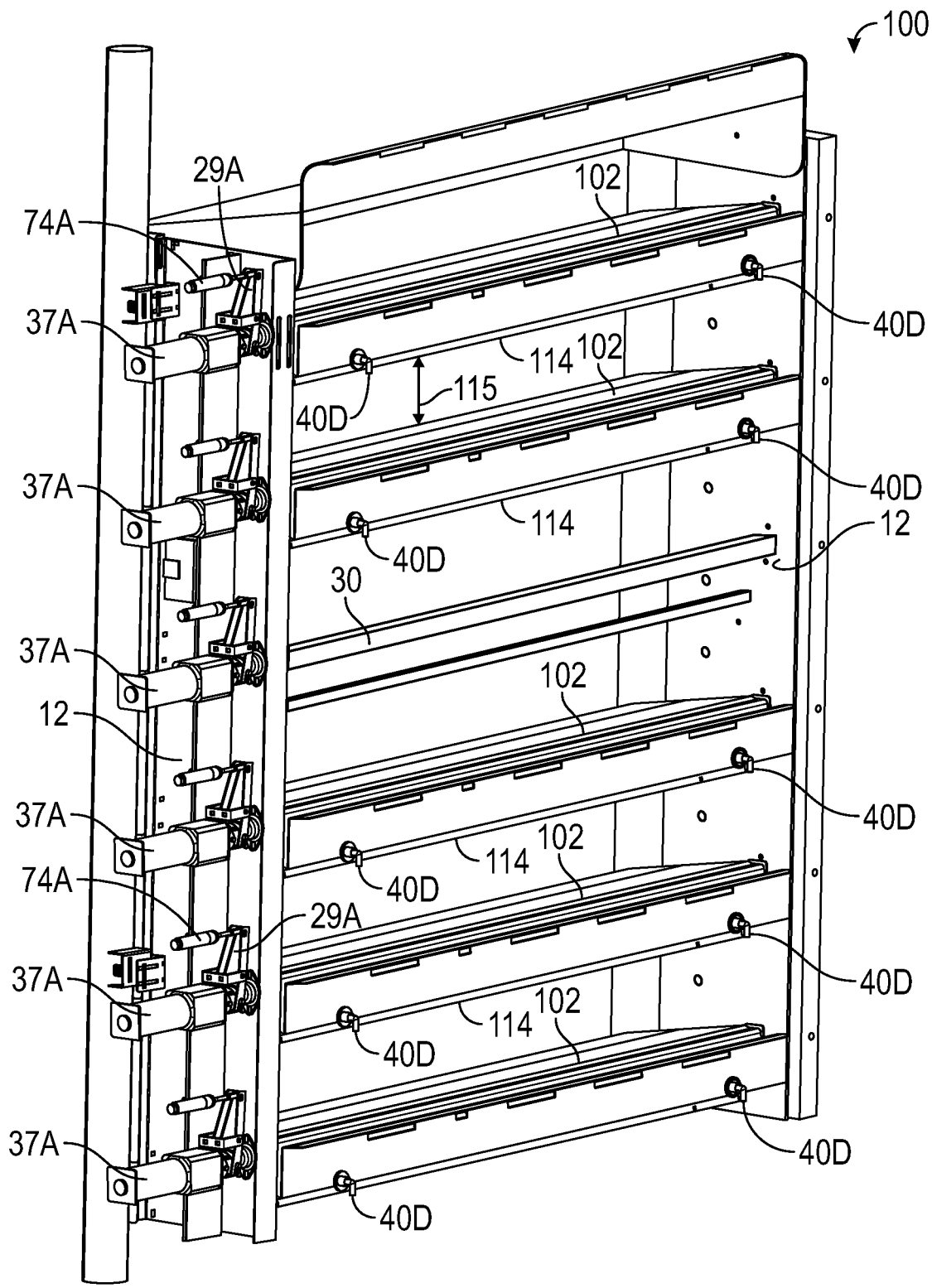
FIG. 10 is a perspective view of a seed belt drive system of the hydroponic grower in accordance with an illustrative aspect of the disclosure.
Figure 11:
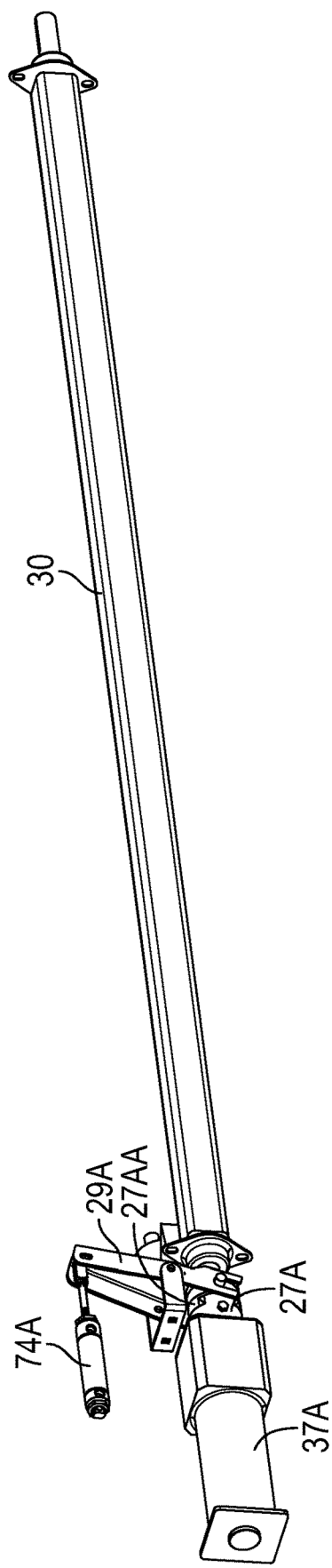
FIG. 11 is a perspective view of the seed belt drive system illustrating a single seed belt drive mechanism with an engaged clutch.
Figure 12:
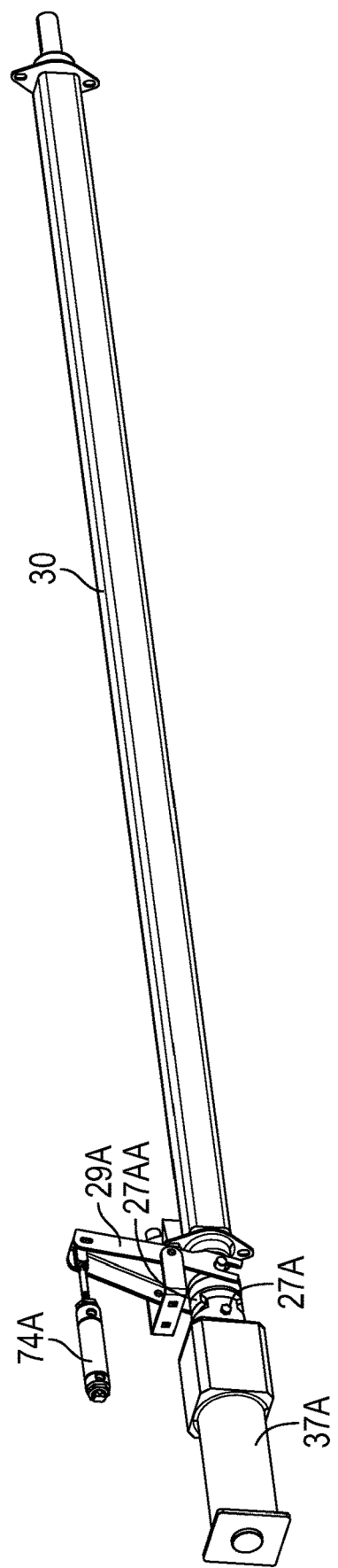
FIG. 12 is another perspective view of the seed belt drive system illustrating the single seed belt drive mechanism with a disengaged clutch.
Figure 13:
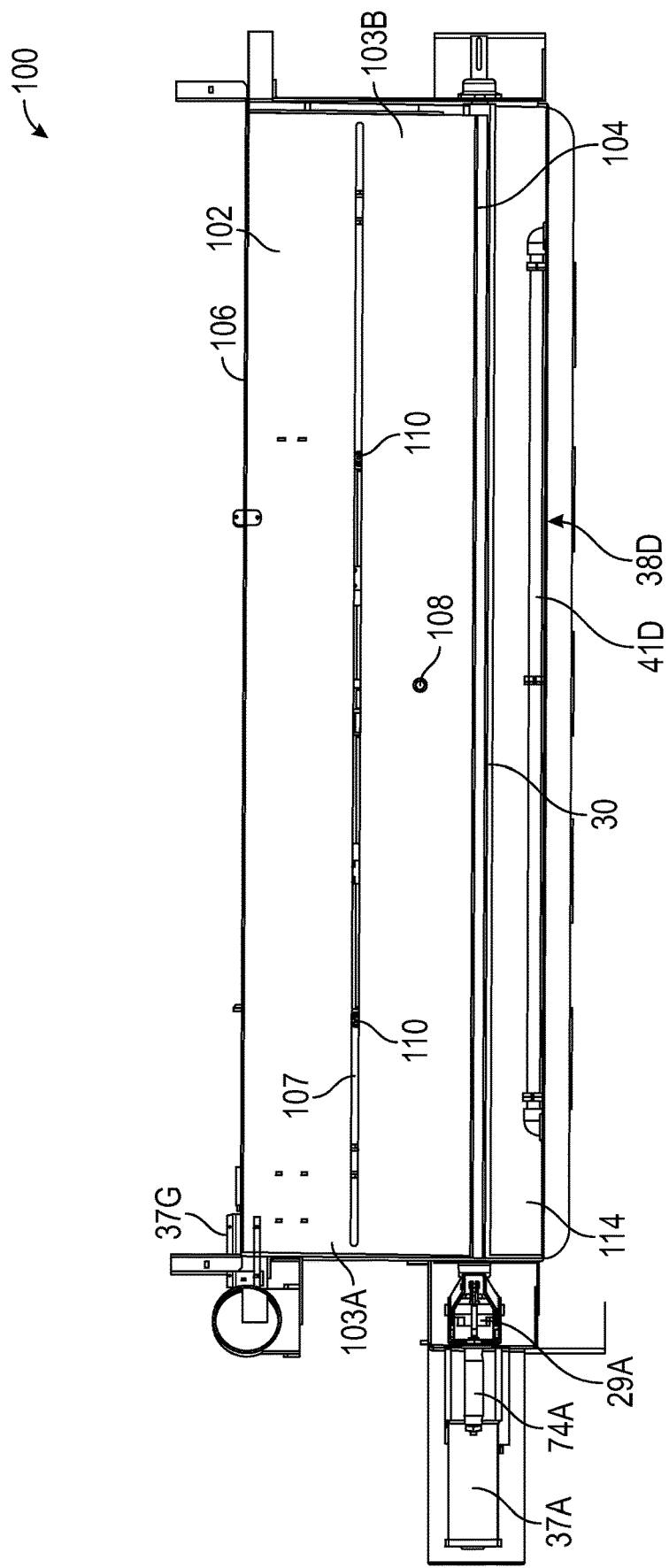
FIG. 13 is a top view of a cutter of the hydroponic grower in accordance with an illustrative aspect of the disclosure.
Figure 14:
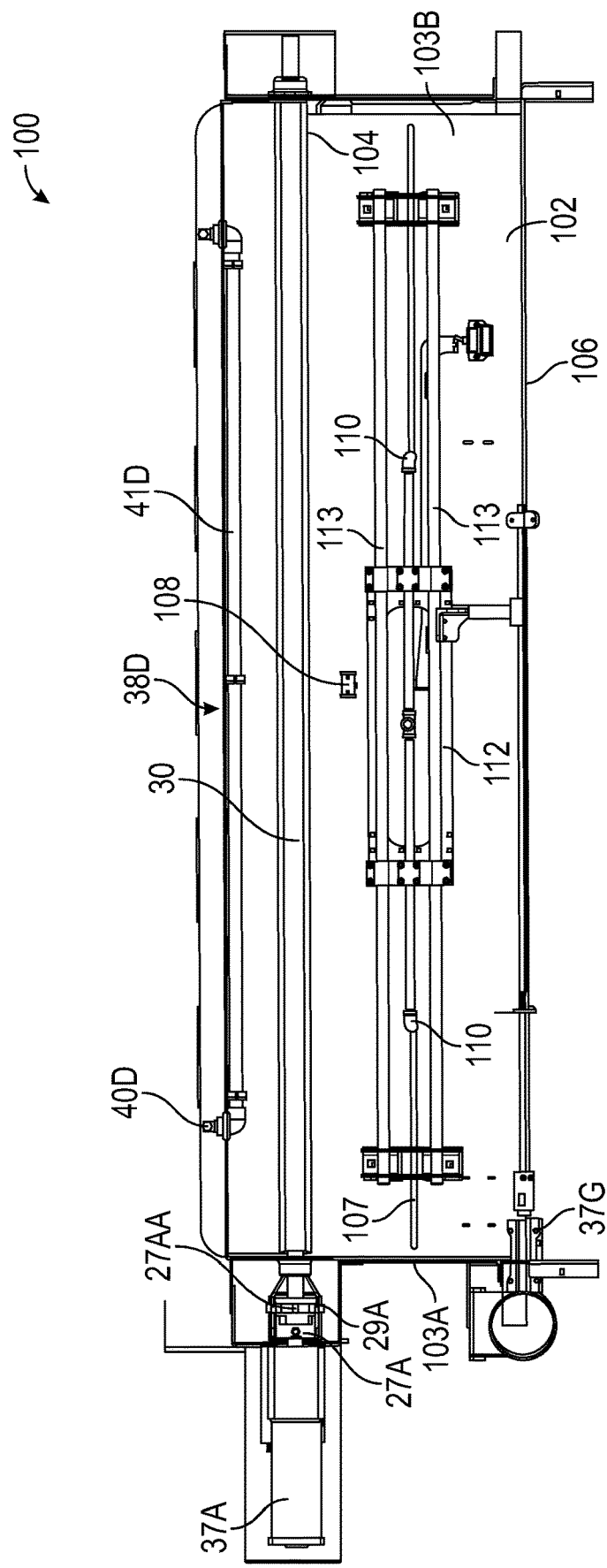
FIG. 14 is a bottom view of the cutter.
Figure 15:
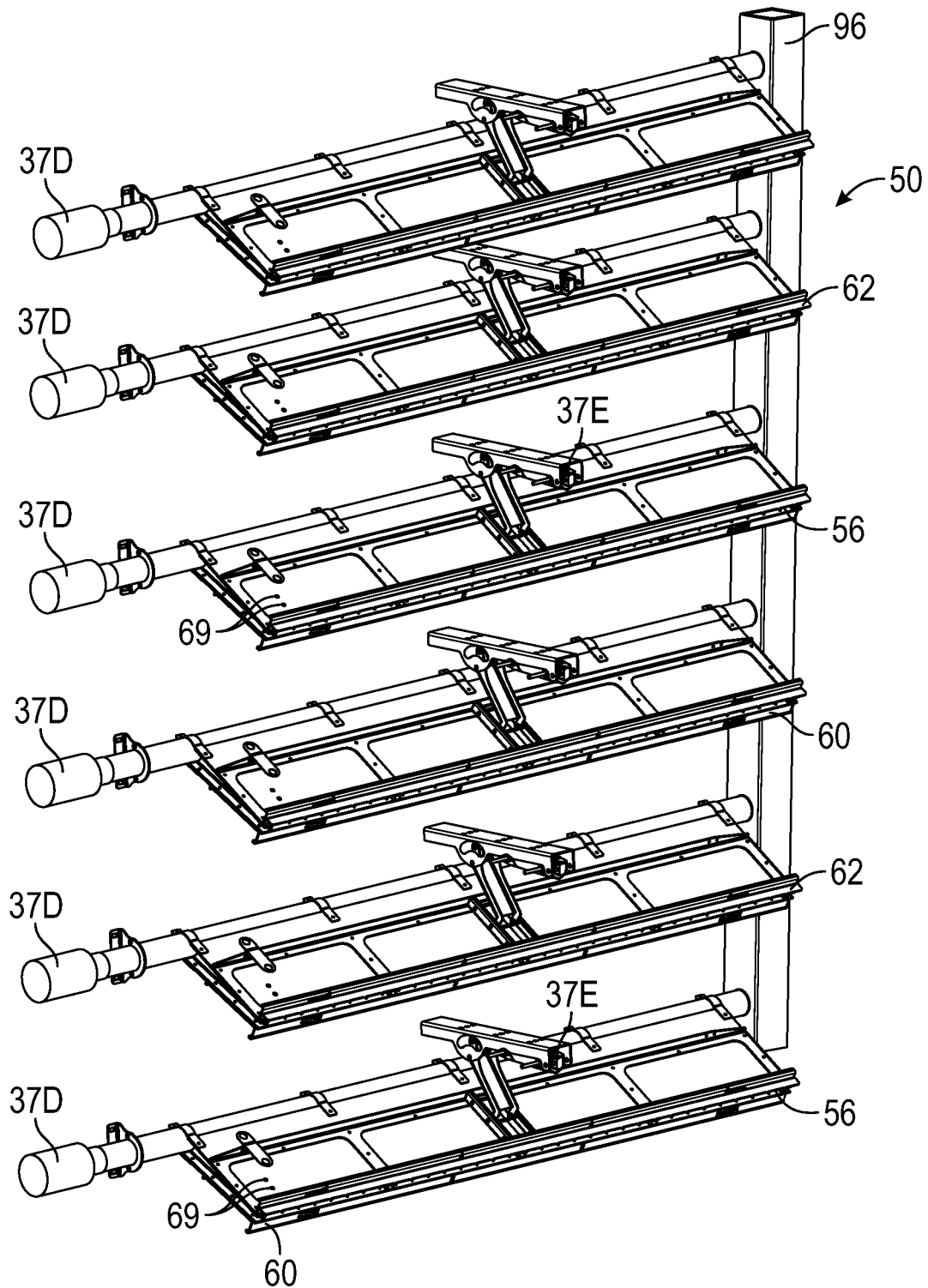
FIG. 15 is a perspective view of a seed dispenser system of the hydroponic grower in accordance with an illustrative aspect of the disclosure.
Figure 16:
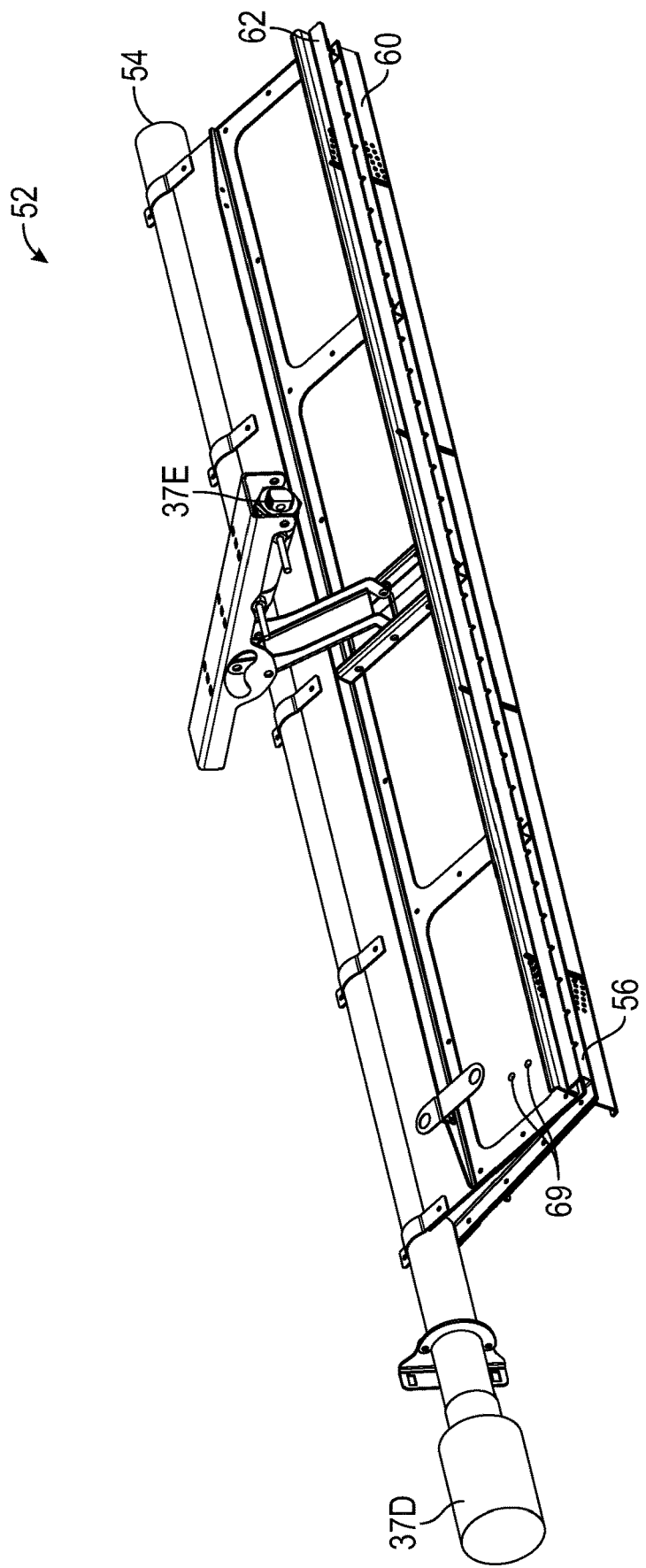
FIG. 16 is a perspective view of the seed dispenser system illustrating a single seed dispenser mechanism thereof.
Figure 17:
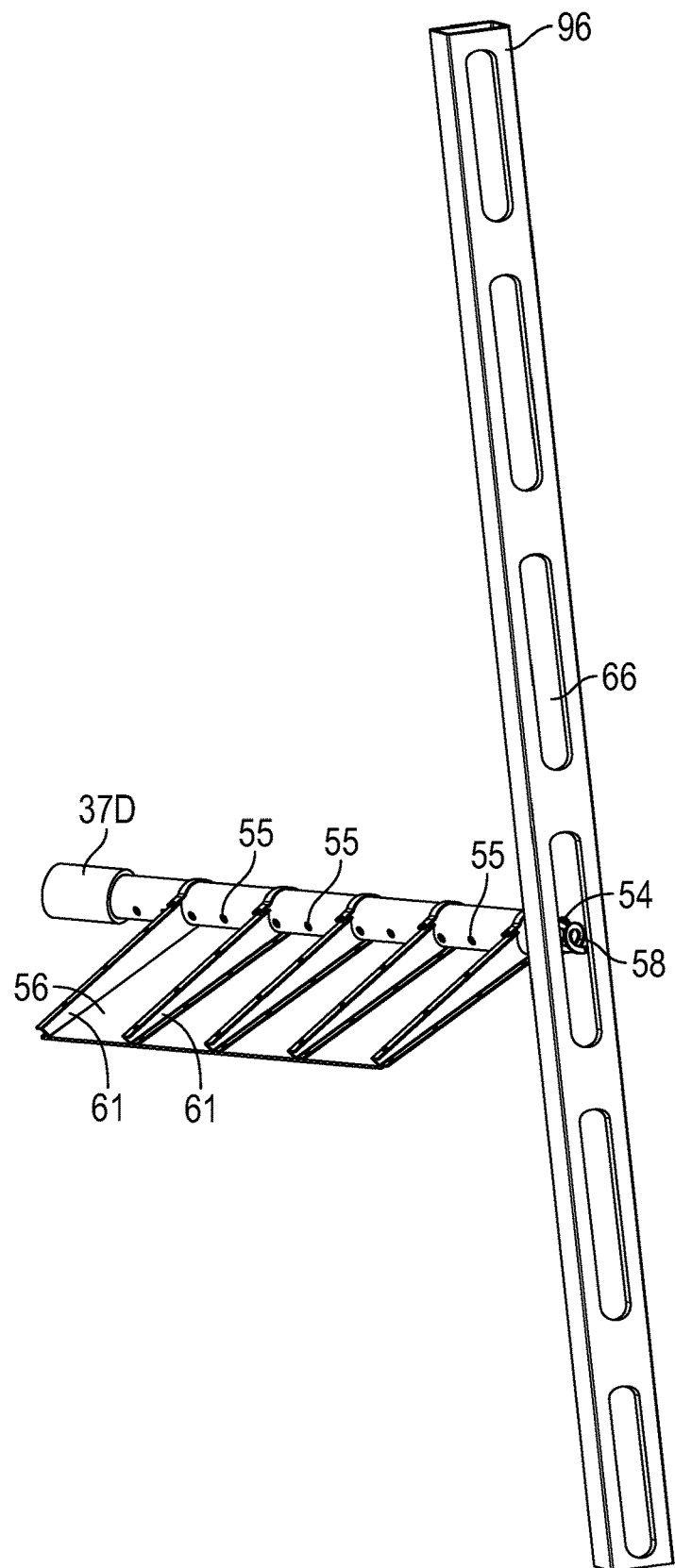
FIG. 17 is a perspective view of the seed dispenser system illustrating a single seed mechanism and seed staging column thereof.
Figure 18:
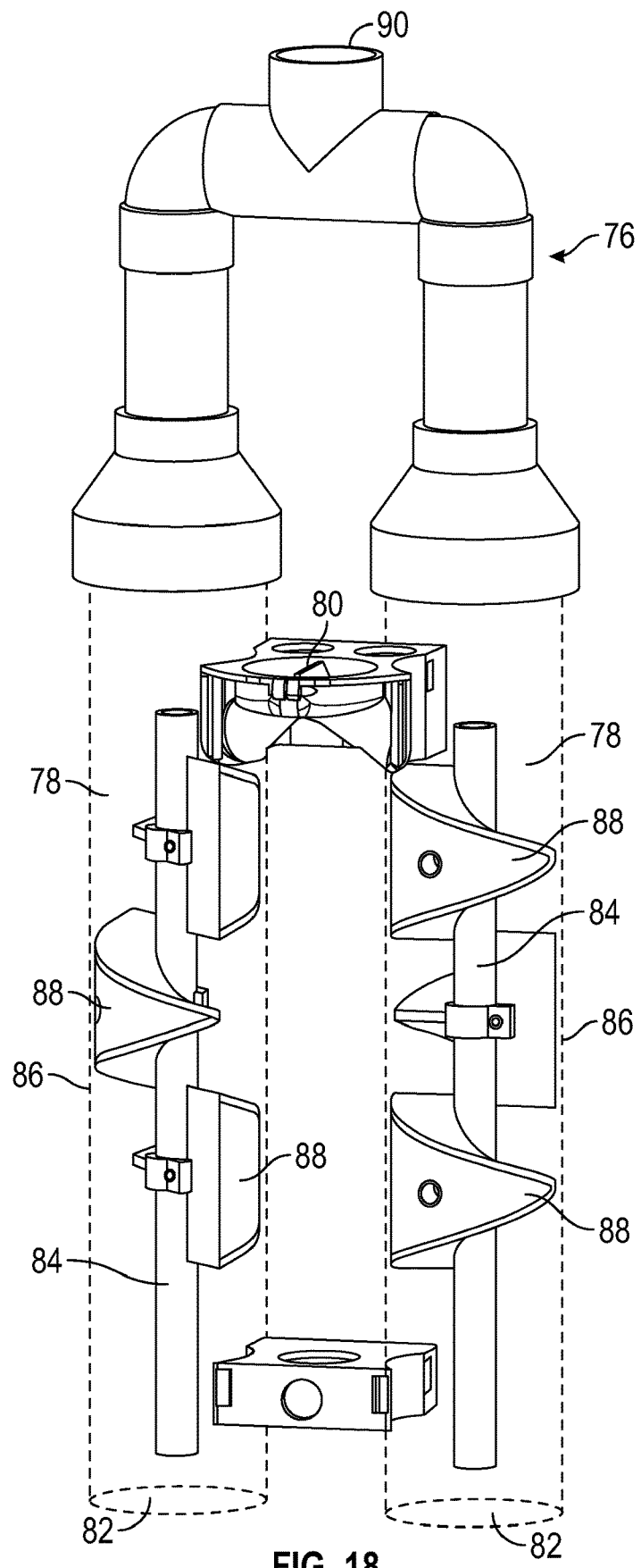
FIG. 18 is a perspective view of a seed cleaner of the hydroponic grower in accordance with an illustrative aspect of the disclosure.
Figure 19:
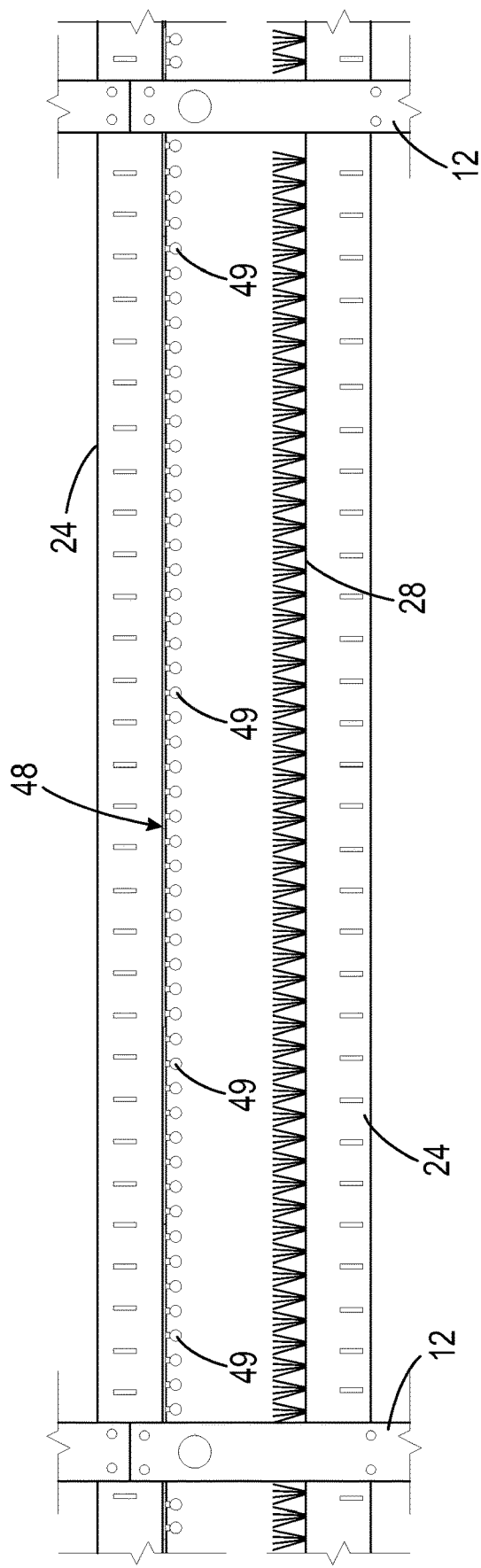
FIG. 19 is a side perspective view of a portion of the hydroponic grower illustrating a lighting system thereof.
Figure 20:
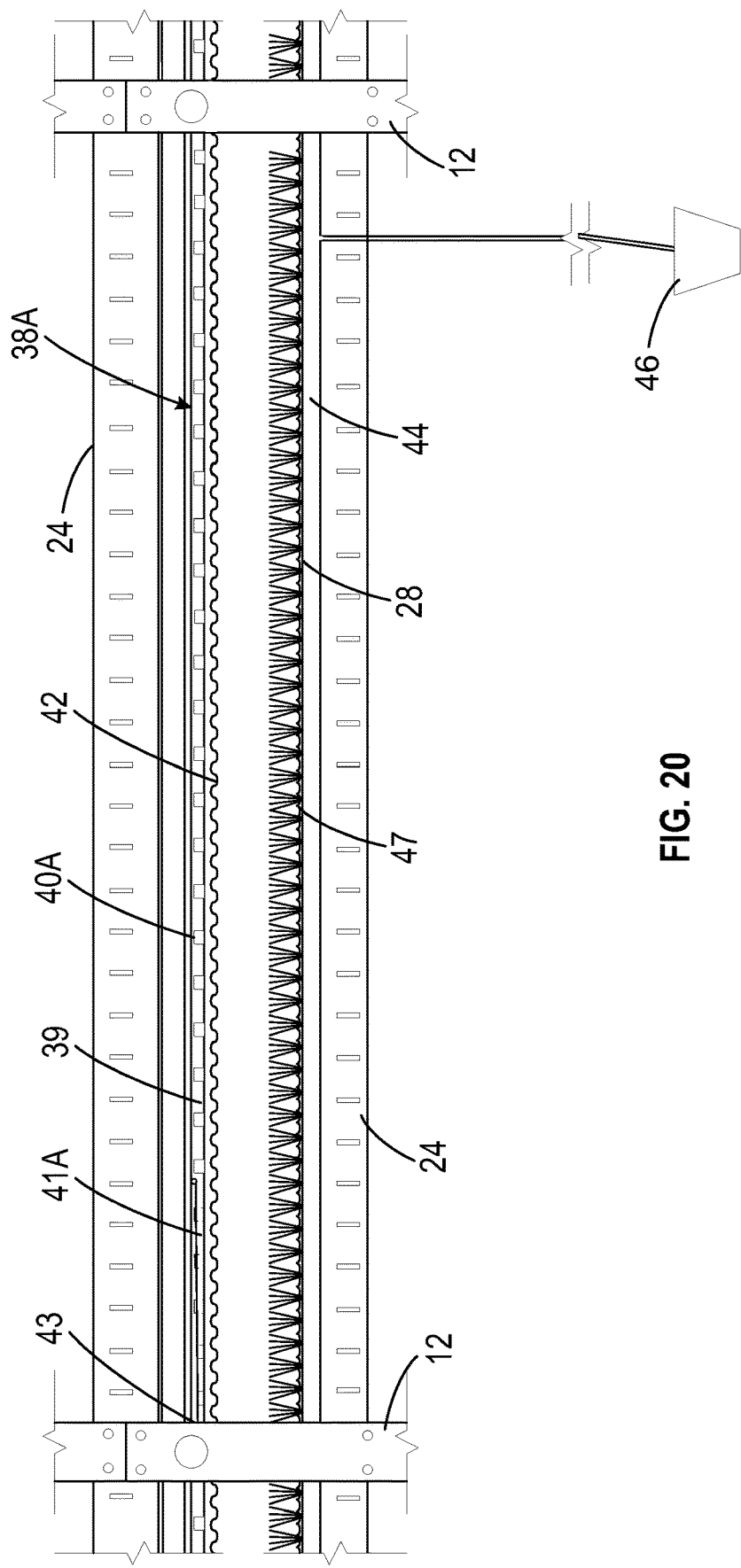
FIG. 20 is a side perspective view of a portion of the hydroponic grower illustrating an irrigation system thereof.
Figure 21:
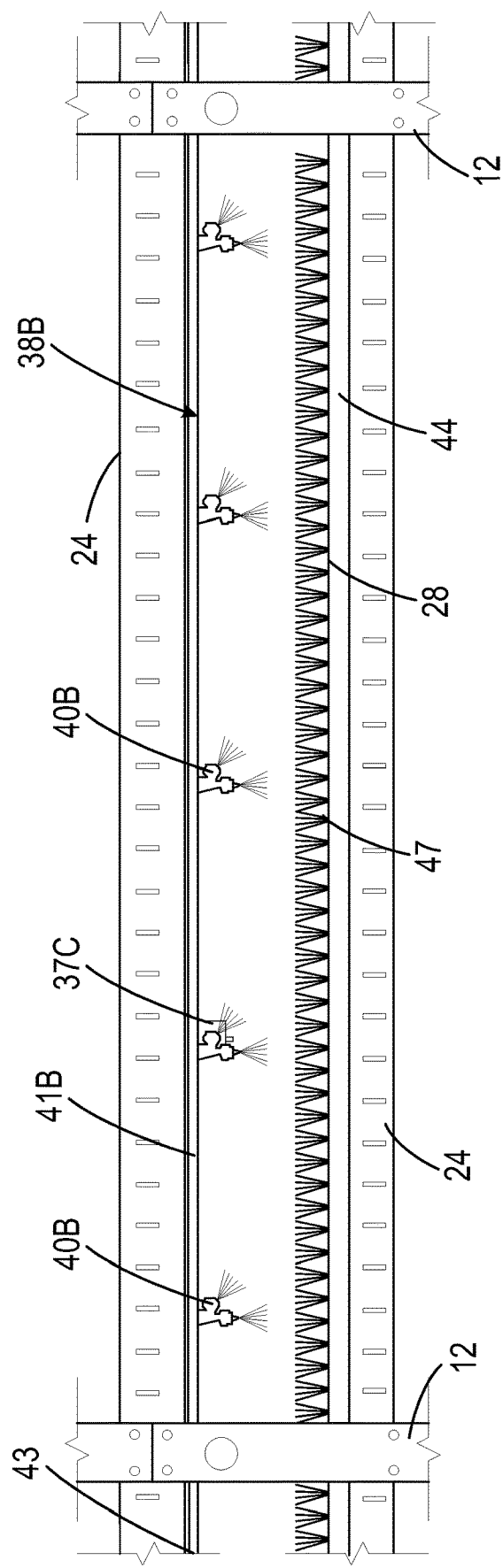
FIG. 21 is a side perspective view of a portion of the hydroponic grower illustrating another irrigation system thereof.
Figure 24:
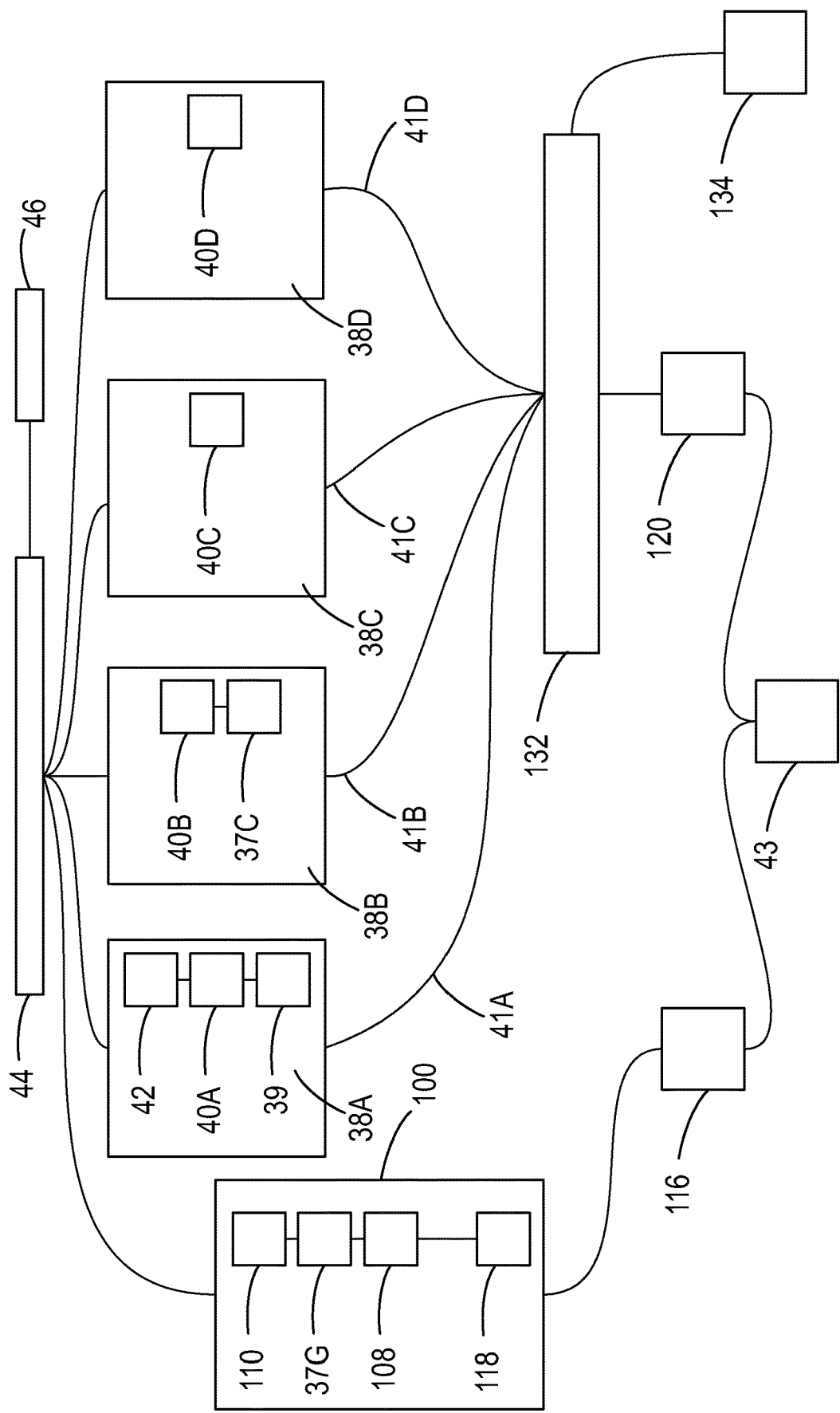
FIG. 24 is a schematic illustration of liquid applications, handling, collection and recycling for the hydroponic grower in accordance with an illustrative aspect of the disclosure.
Figure 25:
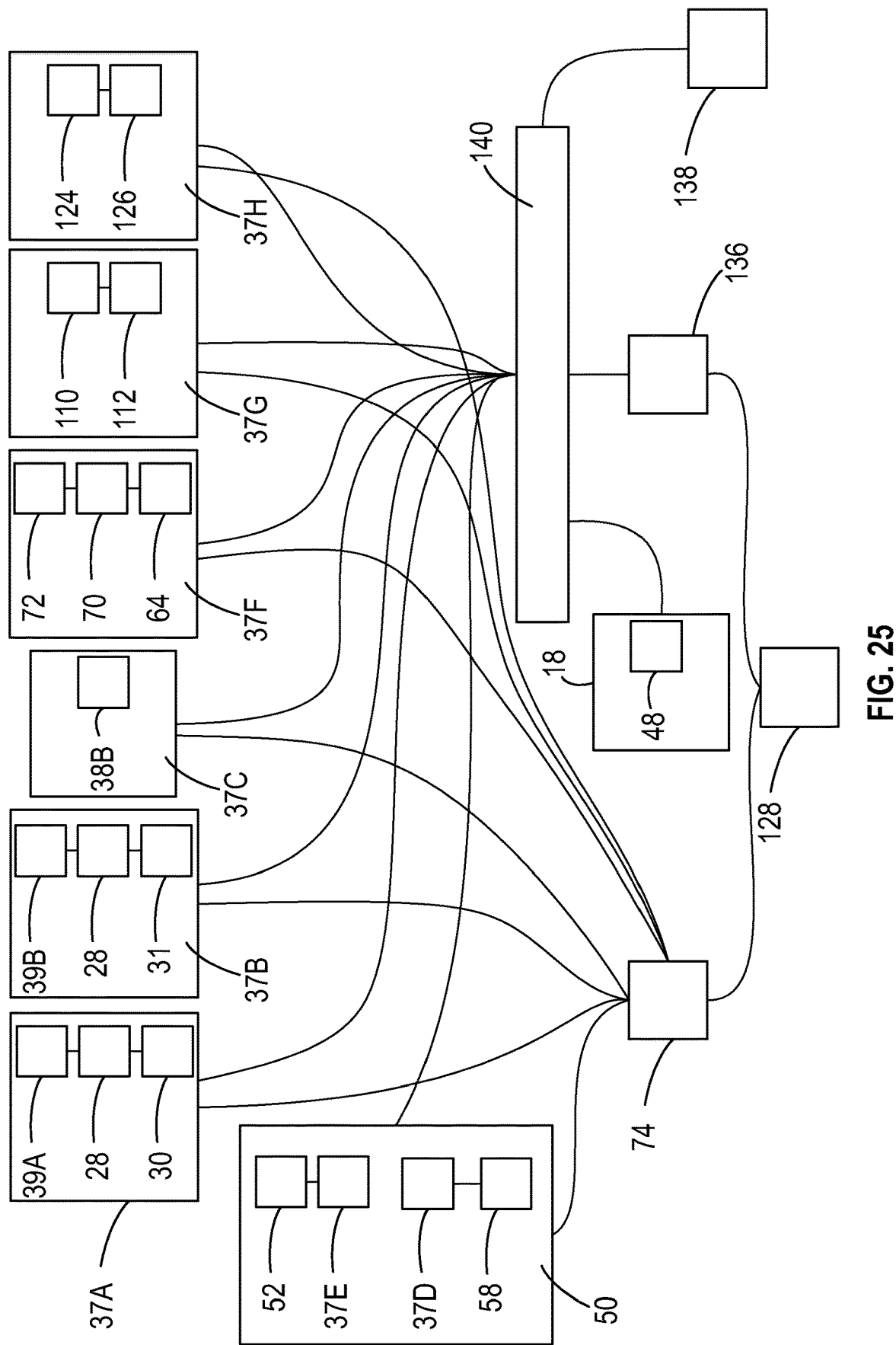
FIG. 25 is a schematic illustration of a controller, drive mechanisms and power applications system for the hydroponic grower in accordance with an illustrative aspect of the disclosure.
Figure 26:
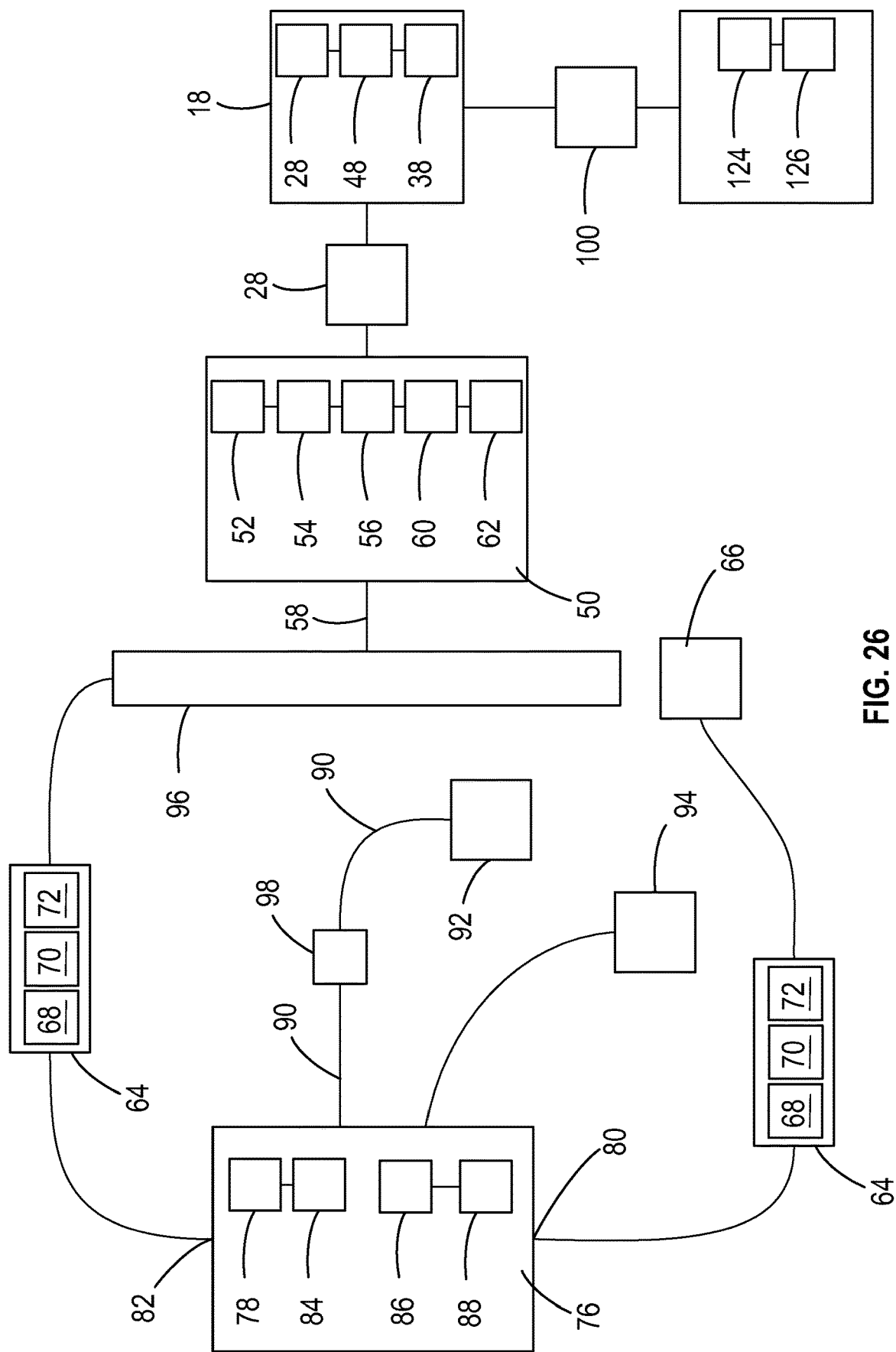
FIG. 26 is a schematic illustration of seed and grown plant handling and growth systems for the hydroponic grower in accordance with an illustrative aspect of the disclosure.

When the seed belt 28 is moved in the first direction, the clutch 29A operably attached between roller 30 and drive mechanism 37A is engaged (i.e., clutch plates 27A and 27AA are clamped together, see FIG. 11), the clutch 29B operably attached between drive mechanism 37B and reel 31 is disengaged (i.e., clutch plates 27B and 27BB are unclamped from each other, see FIG. 8), the seed belt 28 is wound on roller 30 by actuation of drive mechanism 37A, and cable 33 of connector 26 is unwound from reel 31. Conversely, when the seed belt 28 is moved in the second direction, the clutch 29A operably attached between roller 30 and drive mechanism 37A is disengaged (i.e., clutch plates 27A and 27AA are unclamped from each other, see FIG. 12), the clutch 29B operably attached between drive mechanism 37B and reel 31 is engaged (i.e., clutch plates 27B and 27BB are clamped together, see FIG. 9), seed belt 28 is unwound from roller 30, and cable 33 of connector 26 is wound on reel 31 by actuation of drive mechanism 37B. Seed belt 28 moves between offloading and onloading positions and continuous positions therebetween by operating drive mechanisms 37A or 37B. The seed belt 28 is in an "onloaded position" when the seed belt 28 is atop the seed bed 18 and terminal end 32B is proximate reel 31 (see, for example, FIG. 5). Conversely, seed belt 28 is in an "offloaded position" when terminal end 32B is proximate roller 30 and seed belt 28 is wound on roller 30 (see, for example, FIG. 6). One or more limit switches can be disposed proximate opposite ends of the seed bed 18. The limit switches can be operably mounted to monitor movement of the seed belt 28. Limit switches can be tripped by one or more switch members 45 operably attached to linkage 34 or push bar 35 on terminal end 32B of seed belt 28. In one aspect, the limit switches can monitor the location of terminal end 32B relative to roller 30 and reel 31. For example, drive mechanism 37A can be turned off and/or clutch 29A disengaged to stop movement of seed belt 28 when terminal end 32B is proximate roller 30. Conversely, drive mechanism 37B of belt return 26 can be turned off and/or clutch 29B disengaged to stop movement of seed belt 28 when the terminal end 32B is proximate reel 31. Before moving seed belt 28, controller 140 can activate drive mechanism 37A and/or drive mechanism 37B to remove tension off of seed belt 28 to allow clutch 29A and/or clutch 29B to engage or disengage with respective drive mechanism 37A or 37B. Each clutch 29A and 29B can include one or more sensors to verify clutch position to prevent drive mechanism 37A from moving seed bed 28 before disengaging clutch 29B from drive mechanism 37B or to prevent drive mechanism 37B from moving seed bed 28 before disengaging clutch 29A from drive mechanism 37A. The process of monitoring and controlling movement of seed belt 28, monitoring and controlling drive mechanisms 37A-B, monitoring and controlling clutches 29A-B can be automated by a controller 140, graphical user interface, and/or remote control.

III. Liquids Application for Seed

Each seed bed 18 includes a liquid applicator 38A, 38B and 38C operably configured atop each seed bed 18 for irrigating seed disposed atop each seed belt 28. Liquid applicator 38A is configured adjacent at least one longitudinal edge of seed belt 28. Liquid applicator 38A can also be operably configured adjacent at least one lateral edge of seed belt 28. Preferably, liquid applicator 38A is configured adjacent a longitudinal edge of seed belt 28 to thereby provide drip-flood irrigation to seed belt 28 and seed disposed atop seed belt 28. Liquid applicator 38A includes a liquid guide 39 and liquid distributor 40A with a liquid egress 42 having a generally undulated profile, such as a sawtooth or wavy profile generally providing peak (higher elevated) and valley (lower elevated) portions. Liquid applicator 38A can include a liquid line 41A configured to carry liquid from a liquid source 43, such as a liquid collector 46 or plumbed liquid source 43. Liquid exits liquid line 41A through one or more openings and is captured upon exiting liquid line 41A by liquid guide 39 and liquid distributor 40A. The one or more openings in liquid line 41A can be configured as liquid drippers, intermittently dripping a known or quantifiable amount of liquid over a set timeframe into liquid guide 39. The one or more openings be configured intermittently along a length of liquid line 41A or dispersed in groupings along a length of liquid line 41A. The one or more openings in liquid line 41A can be operably configured to equally distribute the water down the seed bed 18 and slowly drip liquid onto each seed bed 18. It is important to keep seed saturated during early stages of hydroponic growth. Drip irrigating the seed belt for providing a layer of water 47 for saturating seed is achieved by operating liquid applicator 38A. Liquid applicator 38A can be operated manually or automatically using one or more controllers operated by a control system 140. The process of irrigating seed with liquid applicator 38A by controlling the on and off position of one or more liquid valves can be automated by a controller 140, graphical user interface, and/or remote control.

Drip or flood irrigation can provide liquid to seed on seed bed 18 in a controlled, even distributive flow. Liquid distributor 40A can be configured with a liquid guide 39 (e.g., a hood portion) adapted to collect liquid as it exits liquid line 41A. Collected liquid is evenly distributed by liquid distributor 40A and exits liquid distributor 40A onto seed belt 28 via liquid egress 42. According to at least one aspect, liquid egresses onto seed belt 28 through valley (lower elevated) portions of liquid egress 42. In this manner, egressing liquid is evenly distributed across seed belt 28. A liquid applicator 38A is generally configured to irrigate seed belt 28 from a longitudinal edge of seed belt 28. Liquid applicator 38A can be operably configured along a longitudinal edge of seed belt 28 at an elevation generally above the elevation of the seed belt 28. In one aspect, liquid distributor 40A can be operably configured to extend inward from the longitudinal edge of seed belt 28 to thereby position liquid egress 42 a further distance away from the longitudinal edge of seed belt 28 in a direction toward the center of seed belt 28. In another aspect, liquid distributor 40A can be configured having a downward profile to encourage movement of liquid toward liquid egress 42. According to at least one design, liquid egressing from liquid distributor 40A travels atop seed belt 28 beneath and/or between a seed mass atop seed belt 28. Other configurations of liquid applicator 38 are also contemplated herein. For example, in one design, liquid enters liquid applicator 38 through a liquid line 41A and exits liquid line 41A through a plurality of openings. Liquid from liquid line 41A coalesces into a small reservoir creating a balanced distribution of liquid across a length of liquid distributor 40A. When this small reservoir becomes full the liquid runs over and out of liquid egress 42, such as between the teeth of liquid egress 42. In this manner, liquid is equally distributed down an entire length of each seed bed 18 of the seed growing table 16. From liquid egress 42, liquid drips onto a seed belt 28 of each seed bed 18 where it runs under a bulk of seed on the seed belt 28 to hydrate the seed. The root system of seed on seed belt 28, along with a wicking effect, moves the liquid up through the seed to water all the seeds and/or plants.

Liquid applicator 38B is disposed atop each seed bed 18. Liquid applicator 38B includes a plurality of liquid distributors 40B operably configured in a liquid line 41B operably plumbed to a liquid source 43. Liquid distributor 40B can be spray heads, such as single or dual-band spray heads/tips, for spray irrigating seed disposed atop each seed belt 28. In one aspect, a plurality of liquid lines 41B are disposed in a spaced arrangement atop each seed bed 18. Each liquid line 41B traverses the length of the seed bed 18 and is plumbed into connection with liquid source 43. Other liquid lines 41B can be configured to traverse the width of seed bed 18. Liquid is discharged from each liquid distributor 40B for spray irrigating seed atop each seed belt 28. In another aspect, each liquid line 41B is oscillated back and forth over a 10°, 15°, 20°, 25°, 30°, 35°, 40°, 45°, or greater radius of travel for covering the entire surface area of the seed atop each seed belt 28. In the case where dual angle spray heads are used for liquid distributor 40B, the oscillation travel of each liquid line 41B can be reduced thereby reducing friction, wear and tear on liquid applicator 38B. A drive mechanism 37C can be operably connected to each liquid line 41A for oscillating or rotating each line through a radius of travel. Liquid applicator 38B can be operated manually or automatically using one or more controllers operated by a control system 140. The process of irrigating seed belt 28 using liquid applicator 38B can be automated by controller 140, graphical user interface, and/or remote control.

Liquid applicator 38C is disposed atop each seed bed 18. Liquid applicator 38C includes a plurality of liquid distributors 40C operably configured in a liquid line 41C operably plumbed to a liquid source 43. Liquid distributor 40C can be spray heads, such as single or dual angle heads, for spray irrigating seed disposed atop each seed belt 28. In one aspect, liquid line 41C is disposed atop and generally traverses the width of each seed bed 18 proximate roller 30 and seed dispenser 52. Each liquid line 41C is plumbed into connection with liquid source 43. Liquid is discharged from each liquid distributor 40C for spray irrigating seed immediately upon discharge from seed dispenser 52 onto each seed belt 28. Liquid line 41C can mounted stationary to the underside of each seed bed 28. Alternatively, liquid line 41C can be oscillated back and forth over a 10°, 15°, 20°, 25°, 30°, 35°, 40°, 45°, or greater radius of travel, like liquid line 41B, for covering a greater surface area of the seed discharged from seed dispenser 52 atop each seed belt 28. In the case where dual-band spray heads/tips are used for liquid distributor 40C, the oscillation travel of each liquid line 41C can be reduced thereby reducing friction, wear and tear on liquid applicator 38C. A drive mechanism akin to drive mechanism 37C for actuating liquid applicator 38B can be used for actuating liquid applicator 38C, in the case where oscillation is desired. Liquid applicator 38C can be operated manually or automatically using one or more controllers operated by a control system 140. The process of irrigating seed belt 28 using liquid applicator 38C can be automated by controller 140, graphical user interface, and/or remote control.

Liquid applicator 38D is disposed adjacent roller 30 and includes one or more liquid distributors 40D for directing liquid at the seed belt 28 as it is wound and unwound from roller 30. Liquid applicator 38D is configured to clean seed belt 28 of debris, contaminants, mold, fungi, bacteria, and other foreign/unwanted materials before winding on roller 30. Liquid applicator 38D is also configured to clean seed belt 28 of debris, contaminants, mold, fungi, bacteria, and other foreign/unwanted materials while unwinding seed belt 28 off roller 30. Liquid distributor 40D can be spray heads, such as single or dual angle heads, for spraying roller 30. Liquid line 41D is plumbed into connection with liquid source 43. In one aspect, liquid provided to liquid applicator 38D can include one or more additives or disinfectants, such as chlorine or hydrogen peroxide, to kill bacteria, fungi, or mold on seed belt 28. In one aspect, hydrogen peroxide is used as a disinfectant to kill mold spores, fungi or bacteria while preventing good bacteria present on the seed belt 28 from being destroyed during the disinfection process. Liquid applicator 38D can also be used to irrigate seed with a disinfectant as seed is released onto seed belt 28 from seed dispenser 52. A disinfectant can be used to disinfect seed on the seed belt 28. A time delay operable by controller 140 can be used to allow disinfectant to remain on seed for a desired time before applying irrigating with fresh water. Liquid applicator 38D can be operated manually or automatically using one or more controllers operated by a control system 140. The process of cleaning, descaling and disinfecting seed belt 28 using liquid applicator 38D can be automated by controller 140, graphical user interface, and/or remote control.

Duration and timing of liquid application using liquid applicators 38A-D can be automated by controller 140, graphical user interface, and/or remote control. Liquid applicator 38A can be operated immediately after seeding of seed bed 28 to saturate seed with liquid. Seed in early, mid and late stages of growth can be irrigated using liquid applicator 38A. Liquid applicator 38B can also be operated immediately after seeding of seed bed 28 to saturate seed with liquid. Seed in early, mid and late stages of growth can also be irrigated using liquid applicator 38B. Liquid applicators 38A-D can be operated simultaneously, intermittently, alternately, and independent of each other. During early stages of seed growth, both liquid applicators 38A-B are operated to best saturate seed to promote sprouting. During later stages of growth, liquid applicator 38A can be used to irrigate more than liquid applicator 38B. Alternatively, liquid applicator 38B can be used to irrigate more than liquid applicator 38A, depending upon saturation level of seed growth. Liquid applicator 38C can be operated during seeding of seed bed 28 and movement of seed bed 28 in the second direction to spray seed dispensed atop seed bed 18 to saturate seed with liquid. In one aspect, liquid provided to liquid applicator 38C can include one or more additives or disinfectants, such as chlorine or hydrogen peroxide, to kill bacteria, fungi, or mold in seed. In one aspect, hydrogen peroxide is used as a disinfectant to kill mold spores, fungi or bacteria while preventing good bacteria present in the seed from being destroyed during the disinfection process. Liquid provided to liquid applicators 38A-D could include additives, such as disinfectants and/or nutrients. Nutrients, such as commonly known plant nutrients, can be added to liquid dispensed from liquid applicators 38A-D to promote growth of healthy plants and/or increase the presence of desired nutrients in harvested seed. Liquid applicators 38C-D can be used also to sanitize seed belt 28 before and/or after winding on or unwinding from roller 30.

Liquid distributors 38A-D and their various components, along with other components of grower 10, can be sanitized by including one or more disinfectants in liquid used by each liquid distributor 38A-D. For example, liquid guide 39, liquid lines 41A-D, liquid egress 42, drain trough 44, liquid collector 46, seed belt 28, liquid distributors 40A-C, and other components of the grower 10 can be sanitized by including one or more disinfectants in liquid used by grower 10. In another aspect, liquid applicators 38A-D can be used to clean and sanitize seed belt 28 before, between, or after seeding and harvesting. A separate liquid distributor or manifold can be configured to disinfect or sanitize any components of grower 10 that carry liquid for irrigation and cutting or receive irrigation or cutting runoff from the one or more seed beds 18 and cutter 100.

IV. Illumination

Each seed bed 18 includes one or more lighting elements 48 housing lights 49 for illuminating seed atop seed belt 28 to facilitate hydroponic growth of seed or a seed mass atop seed belt 28. Lighting elements 48 are operably positioned directly/indirectly above each seed bed 18. Lighting elements 48 can be turned off and on for each level using controller 140. Lighting elements 48 can be powered by an electrochemical source or power storage device 138, electrical outlet, and/or solar power. In one aspect, lighting elements 48 are powered with direct current power. Contemplated lighting elements 48 include, for example, halide, sodium, fluorescent, and LED strips/panels/ropes, but are not limited to those expressly provided herein. One or more reflectors (not shown) can be employed to redirect light from a remote source not disposed above each seed bed 18. Lighting elements 48 can be operably controlled by a controller 140, a timer, user interface or remotely. Operation of lighting elements 48 can be triggered by one or more operations of grower 10. For example, operation of a seed belt 28 can trigger operation of lighting elements 48. The process of lighting a seed bed 18 can be automated by controller 140, graphical user interface, and/or remote control. In one aspect, lighting elements 48 are low heat emission, full ultraviolet (UV) spectrum, light emitting diodes that are cycled off and on with a controller 140, preferably on 18 hours and off 6 hours in a 24-hour period.

V. Seeding

The figures provide pictorial representations of a seeder 50 in accordance with an illustrative aspect. Seeder 50 includes a seed dispenser 52 having an intake 54 configured for connection to seed source 66, such as a seed hopper, and a discharge 56 for dispensing seed onto seed belt 28. Seed dispenser 52 can be configured to extend across the width of seed bed 18 and disposed atop each seed bed 18 proximate one end of each seed bed 18 adjacent roller 30 or adjacent reel 31. In one aspect, seed dispenser 52 is disposed on each seed bed 18 proximate roller 30 to dispense seed onto seed belt 28 when seed belt 28 is unwound from roller 30 and terminal end 32B is drawn toward reel 31. An auger 58, such as a flex auger, is disposed within intake 54 and driven by a drive mechanism 37D for metering seed from seed source 66 out metering apertures 55 and discharge 56. Each seed dispenser 52 is rotatably attached atop seed bed 18 and rotated by a drive mechanism 37E between a first position wherein the discharge 56 is disposed closely adjacent seed belt 28 and the seed dispenser 52 is oriented closer to vertical and a second position wherein discharge 56 is positioned above the seed belt 28 and oriented closer to a horizontal position. Seed dispenser 52 can include one or more veins, ridges, channels, ducts, or elements 61 spaced between auger 58 and discharge 56 for guiding or directing seed from the auger 58 to discharge 56 in a desired pattern or direction for further controlling seed metered onto the seed belt 28. A support plate 60 can be operably attached at discharge 56 of each seed dispenser 52 to support and properly space discharge 56 of seed dispenser 56 on and relative to seed belt 28 while seed is dispensed onto moving seed belt 28. A seed rake 62 can also be operably attached at discharge 56 of each seed dispenser 52 to evenly rake seed across the width of seed belt 28 while seed is dispensed onto moving seed belt 28. Seed rake 62 separates seed into furrows to enhance watering. The drive mechanisms 37D and 37E can be a motor, powered electrically, pneumatically, hydraulically, or even manually. In one aspect, drive mechanism 37D and 37E are driven pneumatically with compressed air from a pneumatic source 74. In the case of drive mechanism 37E, a pneumatic cylinder can be operably attached to seed bed 18 and seed dispenser 52 for rotating discharge 56 between the first and second positions. The pneumatic drive mechanism can be disposed in the middle of the width of each seed bed 18 to best support the weight and movement of seed dispenser 52. Drive mechanism 37E can be operated with compressed air from pneumatic source 74. The process of metering seed with auger 58 by controlling drive mechanism 37D and rotating seed dispenser 52 by controlling drive mechanism 37E can be automated by controller 140, graphical user interface, and/or remote control. Additionally, one or more sensors 69 can be configured within seed dispenser 52 to monitor level of seed within seed dispenser 52. For example, when seed level within seed dispenser 52 drops below a certain level and is detected by a sensor, movement of seed belt 28 can be stopped to wait for seed dispenser 52 to fill back up with seed to insure level distribution of seed across the entire width of seed belt 28 during seeding. The sensor 69 can be a pressure, light, sound, or other type of sensor suitable for detecting the presence of seed. The sensor 69 can be a switch, such as a pressure switch, light switch, sound switch, or other type of switch suitable for detecting the presence of seed. Seed filling up the seed dispenser between the intake 54 and discharge 56 can trip sensor 69 to indicate that the seed dispenser is full thereby turning off auger 58 under operable control of controller 140. Sensors can be operated in combination with one or more timers to reduce the number of sensors, relays, wiring, connectors and other hardware. Operation of drive mechanism 37D can be controlled with feedback from one or more sensors 69 within seed dispenser. For example, when the level of seed within seed dispenser drops below a certain level, drive mechanism 37D can be actuated to move seed into seed dispenser 52 to fill seed dispenser 52 with seed, while the seed belt 28 is moving or stopped.

Seeder 50 also includes a seed conveyor 64 for conveying seed from seed source 66 to intake 54 of each seed dispenser 52. Seed conveyor 64 can include one or more sections of conduit operably attached between seed source 66 and seed dispenser 52. Seed source 66 can be a seed hopper having a top end through which seed is introduced into seed hopper. Contemplated seed includes, for example, wheat, barley, alfalfa, clover, oats, sorghum, greens, peas, sunflower, buckwheat, millet, hemp, microgreens, short vegetables, and rye, but are not limited to those expressly provided herein. Seed can include a mixture of seed to create a seed blend with desired nutrients and digestive parameters. For example, a seed blend may be used, such as barley and pees, to increase the nutrient content (e.g., omega content) in the grown plant. The grown plant can be used for feed, plant oils, food preservatives and additives, medical uses, nutritional supplements, protein production, cosmetics, and other uses. The one or more sections of conduit of seed conveyor 64 can include augers 68, such as a by rotating a flighted or spiral auger in place, for moving seed through seed conveyor 64 conduit. In another aspect, seed is moved through seed conveyor 64 using intermittently spaced, singulated flighting or gaskets 70 fixed to a draw cable 72 that is pulled through the conduit of seed conveyor 64 by a drive mechanism 37F. Seed can also be metered through seed conveyor 64 using compressed air from pneumatic source 74. The drive mechanisms 37F can be a motor, powered electrically, pneumatically, hydraulically, or even manually. The process of conveying seed with augers 68 or gaskets 70 by controlling drive mechanism 37F can be automated by controller 140, graphical user interface, and/or remote control.

Seeder 50 can include a seed cleaner 76 operably disposed within seed conveyor 64. Often raw or bulk seed contains debris and other contaminants. Seed cleaner 76 removes debris and contaminants from seed before conveying seed to seed dispenser 52. Seed cleaner 76 includes a separator housing 78 having a seed inlet 80, seed discharge 82, and disposed between seed inlet 80 and seed discharge 82 are one or more augers 84 disposed vertically within conduit 86 having a diameter of the flighting 88. Flighting 88 is preferably non-continuous thereby leaving gaps between intermittently spaced sections of flighting for seed, debris and contaminants to freefall from one level of flighting onto the next level of flighting. A vacuum line 90 is operably connected at or near seed inlet 80 and connected at an opposing end to a vacuum source 92. Seed is introduced through seed conveyor 64 into seed cleaner 76 through seed inlet 80 and descends flighting 88 and freefalls between gaps in flighting 88 on each auger 84. Debris and contaminants are sucked into vacuum line 90 and the seed descends through seed discharge free of the debris and contaminants that are suctioned off into a refuse container 94. Suctioned off debris can be discharged onto conveyor belts 124, 126 and discharged with cut grown plant parts. The debris, often in the form of chaff from the seed, is generally ruffage based and can be fed to the animals. The falling seed has a greater mass than the debris and contaminants keeping the seed from being suctioned off by the vacuum line. A valve 98, manually or controller 140 controlled, on vacuum line 90 can be opened to decrease or closed to increase suction in the separator housing 78. Cleaned seed exits seed discharge 82 and is mechanically conveyed through seed conveyor 64 to a staging column 96 operably connected in communication with each seed dispenser 52. Seed is drawn into each seed dispenser 52 from staging column 96 as seed is dispensed onto each seed belt 28. Staging column 96 continues to fill with seed from seed conveyor 64 during seed dispensing. In some instances, seed includes larger debris that cannot be suctioned off without suctioning off seed too. A screen (not shown) can be operably disposed at the exit of seed discharge 82 to screen off larger debris that is not suctioned off while passing through seed cleaner 76. One or more UV lighting elements can be operably configured to irradiate seed within seed cleaner 76 with UV light to kill bacteria on seed. The process of cleaning seed with seed cleaner 76 by controlling the open and closed position of valve 98, irradiating seed with UV light, and the general operation of seed cleaner 76, can be automated by controller 140, graphical user interface, and/or remote control.

VI. Cutting

The figures provide pictorial representations of a cutter 100 in accordance with an illustrative aspect. Each seed bed 18 includes a cutter 100. Cutter 100 includes an offloading plate 102 operably attached to grower 10 adjacent roller 30 and extending across the width of seed bed 18 for harvesting grown plants that consists of sprouted seed, root mass, stem portion, and leaves. For purposes of the present disclosure, when referring to sprouted seed, root mass, stem portion, and leaves, the term "grown plants" is used. It is the grown plants that is harvested from grower 10. Returning to offloading plate 102, the plate is configured to include opposing outer edges 103A-B spaced between an inlet side 104 and discharge side 106. Discharge plate has generally the same width as seed belt 128. Inlet side 104 faces seed belt 28 and is disposed immediately adjacent roller 30 to receive offloaded grown plants. Discharge side 106 faces outward, extending away from roller 30 for offloading cut grown plants. At least one high pressure liquid nozzle 108 is operably attached to a top side of offloading plate 102 and disposed generally in the middle across the width and between inlet side 104 and discharge side 106. Liquid nozzle 108 is oriented to direct a high-pressure stream of liquid directly upward. One or more ports 107 extend through offloading plate 102 across the width and between discharge side 106 and liquid nozzle 108. In one aspect port 107 is configured as a narrow channel, just wide enough for a stream of liquid to pass through, that extends generally across the width of offloading plate 102 and is disposed between nozzle 108 and discharge side 106. On the underside of offloading plate 102 are at least two high pressure liquid nozzles 110 operably mounted to a carriage 112 operably attached to the underside of offloading plate 102. In one aspect, carriage 112 is operably attached to one or more guide shafts 113, using for example, one or more slide bearings. Liquid nozzles 110 are oriented to direct a high-pressure stream of liquid directly upward through port 107 in offloading plate 102. A drive mechanism 37G is operably attached to carriage 112 to actuate carriage 112 between first and second positions. Drive mechanism 37G can be a high torque electrical motor that operates on AC or DC current, or a pneumatic/hydraulic motor or cylinder. In one aspect, the electrical motor can be an intermittent duty 12 VDC, 10+ amp motor. Movement of carriage 112 between first and second positions moves a first one of liquid nozzles 110 generally across half of port 107 and a second one of liquid nozzles 110 generally across the other half of port 107. Alternatively, a single liquid nozzle or multiple liquid nozzles can be mounted to carriage 112 for cutting across the width of offloaded grown plants. The drive mechanism 37G can be a motor, powered electrically, pneumatically, hydraulically, or even manually. In one aspect, drive mechanism 37G is driven electrically with direct current power from a power source, such as a battery or AC-to-DC power converter 136 plugged into a utility service line. One or more switches or sensors (not shown) can be operably configured to control drive mechanism 37G to control movement of carriage 112 in a first and second opposite direction between first and second positions. In one aspect, carriage 112 moves across the width and on the underside of offloading plate 102. In the first position of carriage 112, a first one of liquid nozzles 110 is located nearly adjacent outer edge 103A and the second one of liquid nozzles 112 is located generally at the middle of offloading plate 102. In the second position of carriage 112, a first one of liquid nozzles 110 is located generally at the middle of offloading plate 102 and the second one of liquid nozzles 110 is located nearly adjacent outer edge 103B. During operation, liquid nozzles 110 reciprocate back and forth between first and second positions of the carriage by actuation of drive mechanism 37G. The process of actuating drive mechanism 37G for moving carriage 112 between first and second positions can be automated by controller 140, graphical user interface, and/or remote control. In this manner and in operation, liquid nozzle 108 cuts through offloaded grown plants in a first direction and liquid nozzles 110 cut through offloaded grown plants in a second direction opposite the first direction of liquid nozzle 108.

In one aspect, liquid nozzle 108 cuts longitudinally along the midpoint of offloaded grown plants and liquid nozzles 110 cut transversely across the width of offloaded grown plants. In this manner, offloaded grown plants are cut into portions smaller than the mass of grown plants on seed belt 28. The length of each cut piece of grown plants can be controlled by increasing or decreasing the speed of seed belt 28 or increasing or decreasing the reciprocating speed of carriage 112. To increase the size of cut pieces of grown plants the speed of seed belt 28 or carriage 112 can be reduced. Alternatively, to decrease the size of cut pieces of grown plants the speed of seed belt 28 or carriage 112 can be increased. The process of controlling drive mechanism 37A and 37G for controlling speed of seed belt 28 and carriage 112 can be automated by controller 140, graphical user interface, and/or remote control.

As discussed herein, carriage 112 with liquid nozzles 110 is operably secured to the underside of offloading plate 102 and shielded from being impacted from below by liquid from liquid nozzle 108 and liquid nozzles 110 using a cover plate 114. The distance 115 between offloading plate 102 and cover plate 114 can range from 5 to 8.5 inches, 4 to 7.5 inches, 6 to 9.5 inches. In one aspect, the distance 115 between plates 102 and 114 is at least 8.5 inches to allow taller grown plants to pass between plates 102 and 114 for cutting. A pump 116, such as a high-pressure pump, receiving liquid from liquid source 43, can be operably plumbed, using for example flexible, high-pressure hose, into liquid communication with liquid nozzle 110 and liquid nozzles 112. Pump 116 can operate between 2000-2,500 psi in at least one mode. In another mode, pump can operate at pressures lower than 2000 psi or higher than 2,500 psi. In one aspect, pump 116 is configured to operate liquid nozzles at 2,200 psi with a liquid flowrate of 4 gal/min. One or more valves 118, such as high-pressure valves, can be plumbed into fluid communication between liquid nozzle 108 and liquid nozzles 110. Valves 118 can be controlled manually or electronically by a controller 140, graphical user interface, and/or remote control.

VII. Liquid Application, Handling, Collection and Recycling

The figures provide a pictorial representation of liquid handling, collection and recycling for grower 10. A liquid source 43 is needed to supply liquid to grower 10. One or more pumps are plumbed into liquid communication with liquid source 43. In one aspect, high-pressure pump 116 is plumbed into liquid communication with liquid source 43. Liquid nozzle 108 and liquid nozzles 110 are plumped into liquid communication with pump 116. One or more flexible, high-pressure hoses can be operably configured between pump 116 and liquid nozzle 108 and liquid nozzles 110. Pump 116 can operate between 2000-3,000 psi in at least one mode. In another mode, pump can operate at pressures lower than 2000 psi or higher than 3,000 psi. In one aspect, pump 116 is configured to operate liquid nozzles 108, 110 at 2,200 psi with a liquid flowrate of 4 gal/min. In another aspect, pump 116 is configured to operate liquid nozzles 108, 110 at 2,500 psi with a liquid flowrate of 4-6 gal/min.

One or more valves 118 can be operably plumbed into liquid communication between pump 116 and liquid nozzle 108 and liquid nozzles 110 to control flow of liquid to each nozzle on each seed bed 18. One or more drain troughs can be operably configured at each cutter 100 to collect liquid. Collected liquid can pass through one or more drainage lines operably connected between drain troughs and a sewer drain or liquid collector 46.

Pump 120 can also be plumbed into liquid communication with liquid source 43. liquid applicator 38A, liquid applicator 38B, liquid applicator 38C, and liquid applicator 38D can each be plumbed into liquid communication with pump 120 directly or via a liquid distribution manifold 132. One or more liquid conduits can be operably configured between pump 120 and liquid applicator 38A, liquid applicator 38B, liquid applicator 38C, and liquid applicator 38D to control flow of liquid to each liquid applicator on each seed bed 18. One or more additive or disinfectant sources 134 can be operably plumbed into liquid communication with one or more or all liquid conduits disposed between pump 120 and liquid applicator 38A, liquid applicator 38B, liquid applicator 38C, and liquid applicator 38D. In one aspect, a disinfectant or additive source 134 operably plumbed into liquid communication with liquid conduit attached to liquid applicator 38C can be configured to hold one or more disinfectants, such as chlorine or hydrogen peroxide, for dispensing liquid disinfectant through liquid applicator 38C. A drain trough 44 is operably configured at each seed bed 18 to collect liquid from liquid applicator 38A, liquid applicator 38B, liquid applicator 38C, and liquid applicator 38D. Collected liquid can pass through one or drain lines operably connected between drain trough 44 and a sewer drain or liquid collector 46. For example, as liquid flows across each seed belt 28 of each seed bed 18, which can be tilted towards drain trough 44, any plant that needs liquid will utilize it. Any unused liquid can continue across seed belt 28 and drain into drain trough 44. Once in the drain trough 44 liquid passes in plumbed connection into a liquid collector 46 or sewer drain, depending upon how the system is plumbed, based on the discretion of the owner/operator. According to one design, drain trough 44 can be operably attached to vertical members 12 of grower 10 and the orientation of drain trough 44 relative to level can be configured to control the flow of liquid in drain trough 44 to an outlet or drain. Liquid applicator 38B, liquid applicator 38C, liquid applicator 38D, and liquid applicator 38E can be collected and recycled using the same system used for collecting and recycling liquid from liquid applicator 38A. A liquid applicator 38E can be plumbed into liquid line 41D to dispense liquid from a liquid distributor 40E for spraying liquid into drain trough 44 thereby cleaning drain trough 44. A disinfectant can be included in the liquid dispensed from liquid applicator 38E for disinfecting drain trough 44.

A liquid collector 46 can be operably plumbed into connection with drain trough 44 or other drainage lines of grower 10 for collecting and recycling or discarding runoff liquid. Liquid collector 46 can be configured with an open top to receive descending liquid from above disposed seed beds 18. A liquid collector 46 can be operably plumbed to receive pump pressure from pump 120 to recycle liquid collected from liquid applicator 38A, liquid applicator 38B, liquid applicator 38C, liquid applicator 38D, liquid applicator 38E, and cutter 100. Additives can be combined with liquid in the liquid collector 46 and recycled to liquid applicator 38A, liquid applicator 38B, liquid and applicator 38C for irrigating seed with liquid having desired additives. Liquid collector 46 can be configured as a settling tank where sentiment and other particulate matter separates from liquid before being recycled back to liquid applicator 38A, liquid applicator 38B, liquid and applicator 38C. Liquid collector 46 can be configured alone as a multi-gallon tank, such as a 50-gal, 75-gal, 100-gal or larger capacity tank together with a small settling tank. Liquid collected in liquid collector 46 can be retained and recycled over a 24-hour period, 48-hour period, 72-hour period and so forth before being dumped or discarded into a drain. Liquid collector 46 can be configured with a fitting with a screen material over it (e.g., plastic screen) to catch debris and seed, such as, to prevent them from entering into the plumbed drain system of seed growing table 16. Additives can be introduced directly or indirectly into liquid applicator 38A, liquid applicator 38B, liquid applicator 38C, liquid applicator 38D, and liquid applicator 38E. Contemplated additives include, for example, additives added into a tank to promote plant growth, increase vitamins and minerals in liquid feed form and/or increase seed growth nutritional value, but are not limited to those expressly provided herein. One or more disinfectants, such as chlorine or hydrogen peroxide, can be introduced into liquid applicator liquid applicator 38A, liquid applicator 38B, and liquid applicator 38C. Seed-sprouting and growth nutrients can also be introduced into liquid applicator 38A, liquid applicator 38B, liquid applicator 38C, and liquid applicator 38D to support healthy, development and growth of seed into grown plants. The process of handling, collecting and recycling liquid can be automated by controller 140, graphical user interface, and/or remote control.

VIII. Handling of Cut Grown Plants

Cut grown plants drop under gravity from each seed bed 18 onto a conveyor belt 124 feeding into another conveyor belt 126 that, in one aspect, offloads into a vertical mixer, frontend loader, cart or other container for transporting cut grown plants. Conveyor belts 124, 126 can be actuated with drive mechanism 37H. The drive mechanism 37G can be a motor, powered electrically, pneumatically, hydraulically, or even manually. The process of conveying cut grown plants with conveyor belt 124, 126 by controlling drive mechanism 37G can be automated by controller 140, graphical user interface, and/or remote control. In the case where conveying cut pieces of grown plants upward to a higher elevation is desired, conveyor belt 126 can be configured with upstanding ridges for keeping cut pieces of grown plants stationary on conveyor belt 126 while ascending. The shape of conveyor belt 126 can be altered to further grip and keep cut pieces of grown plants stationary while conveyor belt 126 ascends. For example, the ridges can be notched so that conveyor belt 126 can be conformed from a flat shape into a U-shape to cup or surround cut pieces of grown plants to keep stationary plant pieces from falling down the belt when ascending, such as, up steep inclines. In the case where multiple growers are configured side-by-side, cut grown plants drop from each grower 10 onto conveyor belt 124 feeding into conveyor belt 126.

IX. Power Sources

A power source 128, such as a 110V or 220V service from an electrical utility, can be used to power grower 10. Power source 128 can be from renewable power sources, such as hydropower, biomass wood, biomass waste, biomass biofuels, wind, geothermal, and/or solar. Power source 128 can a direct current or alternating current source. In one aspect, grower 10 includes an AC/DC power converter 136 for powering one or more drive mechanisms 37A-H with direct current. According to at least one configuration, each of the one or more drive mechanisms 37A-H can receive direct current from an independent power converter 136 for driving one or more DC motors. Increasing amperage to each motor, as needed, can increase the drive torque of each motor. Controlling operation of each motor and amperage to each motor can be automated by a controller 140, graphical user interface, and/or remote control. Using a direct current power source reduces, and can eliminate, shock or electrocution that could result in harm or even death to an operator or owner of grower 10. Power source 128 can be one or more electrochemical cells or power storage device 138. Electrochemical cells or power storage devices 138 can be charged by power from an electrical utility or a renewable power source. In the case of a power outage, grower 10 can be operated using power from one or more electrochemical cells, power storage devices 138 and/or a renewable power source. Power source 128 can be configured to power a pneumatic or hydraulic source of energy. In one aspect, power source 128 operates pneumatic source 74, such as an air compressor, for powering one or more drive mechanisms 37A-H pneumatically. In another aspect, power source 128 operates a hydraulic source 130, such as a hydraulic pump, for powering one or more drive mechanisms 37A-H hydraulically. Drive mechanisms 37A-H can also be operated manually in the case of power or mechanism failure. In one aspect, one or more drive mechanisms 37A-H can be powered with alternating current from power source 128. A power source 128, of the type described, can be operably connected to actuate clutches 29A-B, lighting elements 48, vacuum source 92, pump 116, and pump 120. Switches, relays, voltage-amperage regulator(s) and other electrical components, including but not limited to, drive mechanisms 37A-H, clutches 29A-B, lighting elements 48, vacuum source 92, pump 116, hydraulic source 130, pneumatic source 74, and pump 120 of grower 10 can be automated by controller 140, graphical user interface, and/or remote control.

The present disclosure is not to be limited to the particular aspects described herein. In particular, the present disclosure contemplates numerous variations in the type of ways in which aspects of the disclosure can be applied to a hydroponic growing apparatus, system, and/or method that addresses the deficiencies in existing hydroponic and non-hydroponic processes for growing seed. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes or methods of the disclosure. It is understood that any other modifications, substitutions, and/or additions can be made, which are within the intended spirit and scope of the disclosure. For the foregoing, it can be seen that the disclosure accomplishes at least all of the intended objectives.

The previous detailed description is of a small number of aspects for implementing the disclosure and is not intended to be limiting in scope. The following claims set forth a number of the aspects of the disclosure disclosed with greater particularity.

What is claimed is:

1. A method for hydroponically growing a variety of seed, comprising:
   providing a plurality of seed beds operably supported by a framework, wherein each seed bed includes a seed belt;
   actuating a first drive mechanism for moving the seed belt from an offloaded position to a loaded position;
   actuating a second drive mechanism for moving the seed belt from the loaded position to the offloaded position;
   actuating a third drive mechanism for dispensing seed from a seeder onto the seed belt at least during actuation of the first drive mechanism;
   actuating a fourth drive mechanism for separating offloaded seed growth during actuation of the second drive mechanism.

2. The method of claim 1 further comprising:
   actuating a fifth drive mechanism for rotating a discharge end of the seeder adjacent the seed belt for dispensing seed onto the seed belt during actuation of the first drive mechanism.

3. The method of claim 1, further comprising:
   actuating a sixth drive mechanism for irrigating seed atop the seed belt when the seed belt is in the loaded position.

4. The method of claim 1, further comprising:
   actuating a fifth drive mechanism for rotating a discharge end of the seeder away from the seed belt before actuation of the second drive mechanism.

5. The method of claim 1, further comprising:
   unwinding the seed belt during actuation of the first drive mechanism and winding the seed belt during actuation of the second drive mechanism.

6. The method of claim 1, further comprising:
   actuating a sixth drive mechanism for changing the angle of irrigation atop the seed and relative to the seed belt when the seed belt is in the loaded position.

7. The method of claim 1, further comprising:
   disengaging the second drive mechanism during actuation of the first drive mechanism and disengaging the first drive mechanism during actuation of the second drive mechanism.

8. A method for hydroponically growing a variety of seed, comprising:
   providing one or more seed beds each having a length and a width operably supported by a framework, wherein each seed bed includes a seed belt actuated by opposing drive mechanisms;
   disengaging one of the opposing drive mechanisms while engaging the other drive mechanism for moving the seed belt from an offloaded position to an onloaded position while dispensing seed onto the seed belt;
   disengaging the other drive mechanism while engaging the opposing drive mechanism for moving the seed belt from the onloaded position to the offloaded position for dispensing seed growth from the seed belt; and
   offloading seed growth into a cutter for separating into smaller portions.

9. The method of claim 8, further comprising:
   rotating a discharge end of a seeder into a seed dispensing position atop the seed belt for discharging seed onto the seed belt, the seeder having an intake connected to a seed source and the discharge end for dispensing seed onto the seed belt.

10. The method of claim 8, further comprising:
    operating a drive mechanism for changing an angle of irrigation of one or more irrigation nozzles atop the seed belt.

11. The method of claim 8, further comprising:
    unwinding the seed belt from a roller during movement of the seed belt from the offloaded position to the onloaded position.

12. The method for hydroponically growing seed of claim 8, further comprising:
    winding the seed belt onto a roller during movement of the seed belt from the onloaded position to the offloaded position.

* * * * *